April 17, 1962  E. I. VALYI  3,029,468
APPARATUS FOR MAKING PLASTIC ARTICLES
Filed Nov. 3, 1959  13 Sheets-Sheet 1
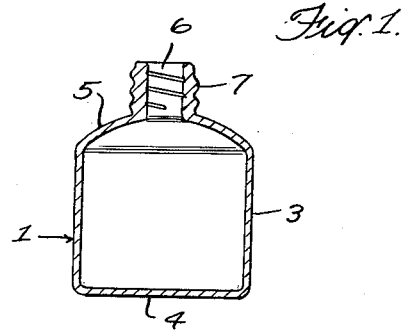
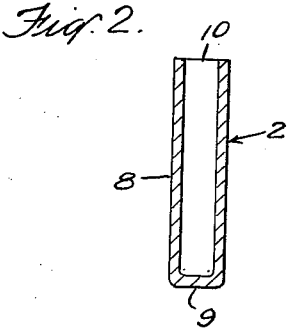
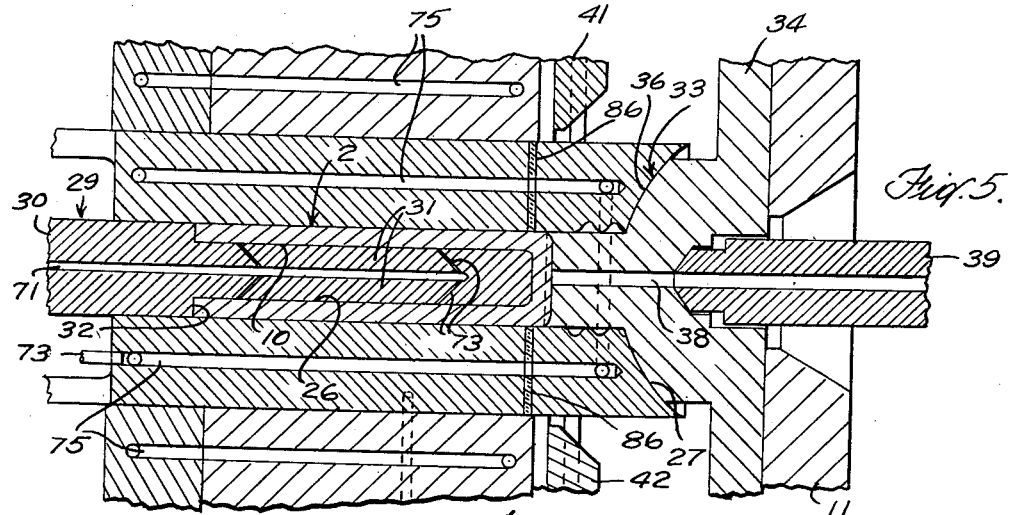
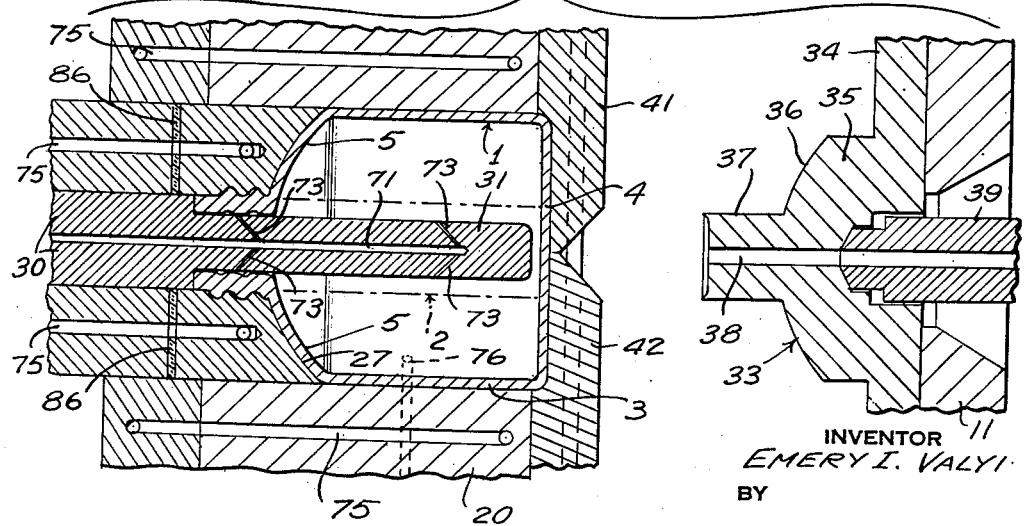
INVENTOR
EMERY I. VALYI
BY
ATTORNEY

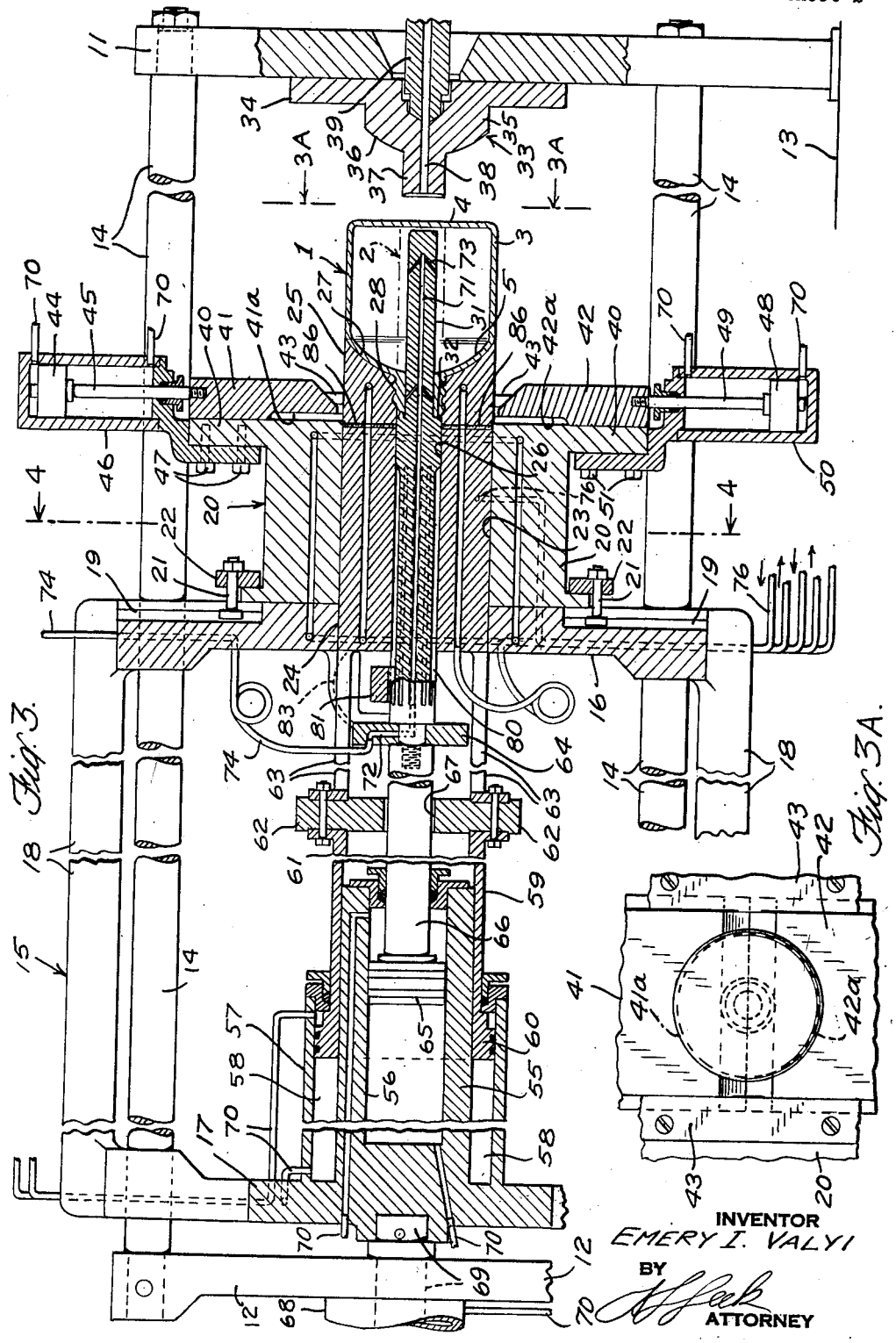

INVENTOR
EMERY I. VALYI

April 17, 1962     E. I. VALYI     3,029,468
APPARATUS FOR MAKING PLASTIC ARTICLES
Filed Nov. 3, 1959     13 Sheets-Sheet 4
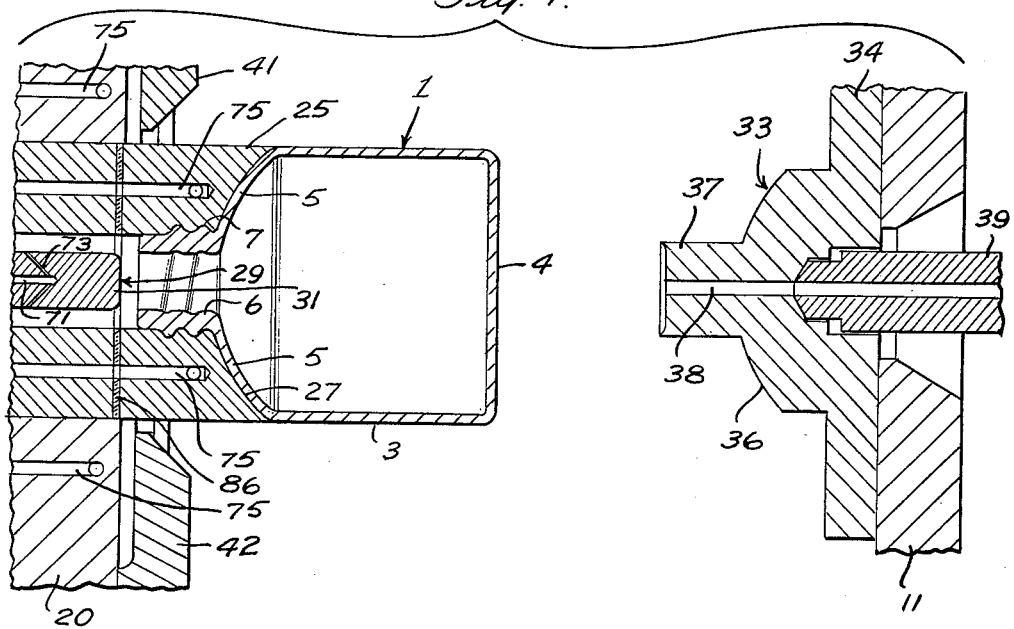
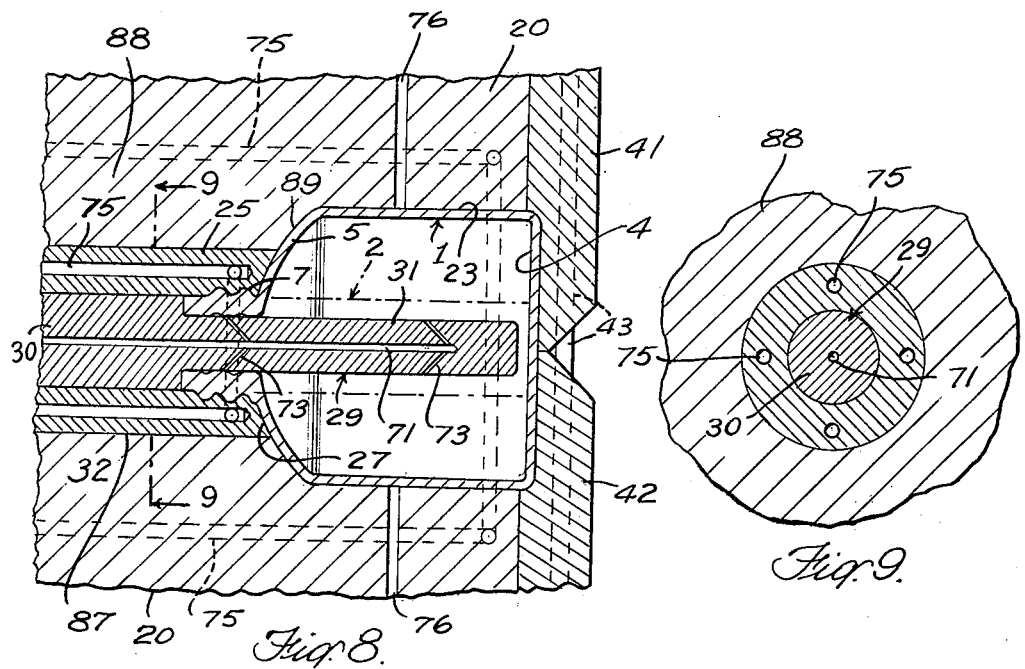
INVENTOR
EMERY I. VALYI
BY
ATTORNEY April 17, 1962
E. I. VALYI
3,029,468
APPARATUS FOR MAKING PLASTIC ARTICLES
Filed Nov. 3, 1959
13 Sheets-Sheet 5
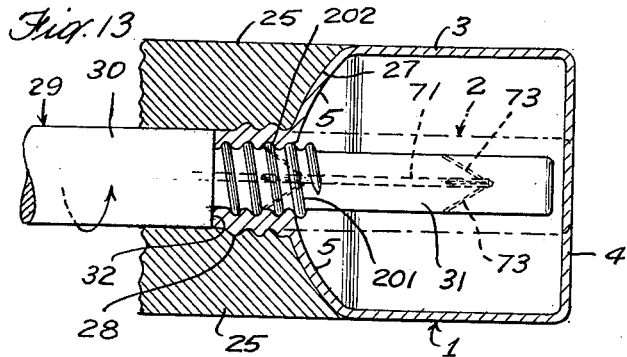
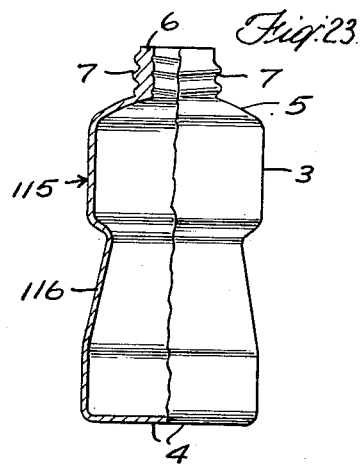
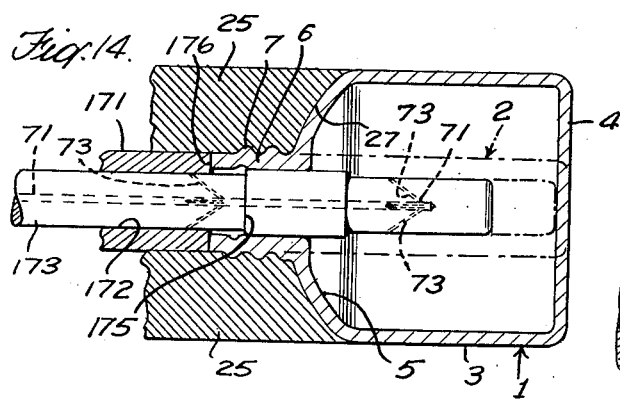
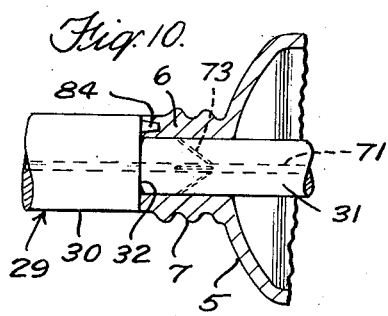
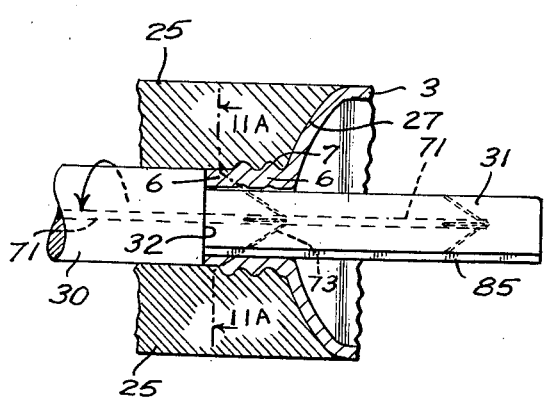
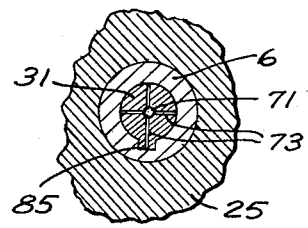
INVENTOR
EMERY I. VALYI
BY
ATTORNEY

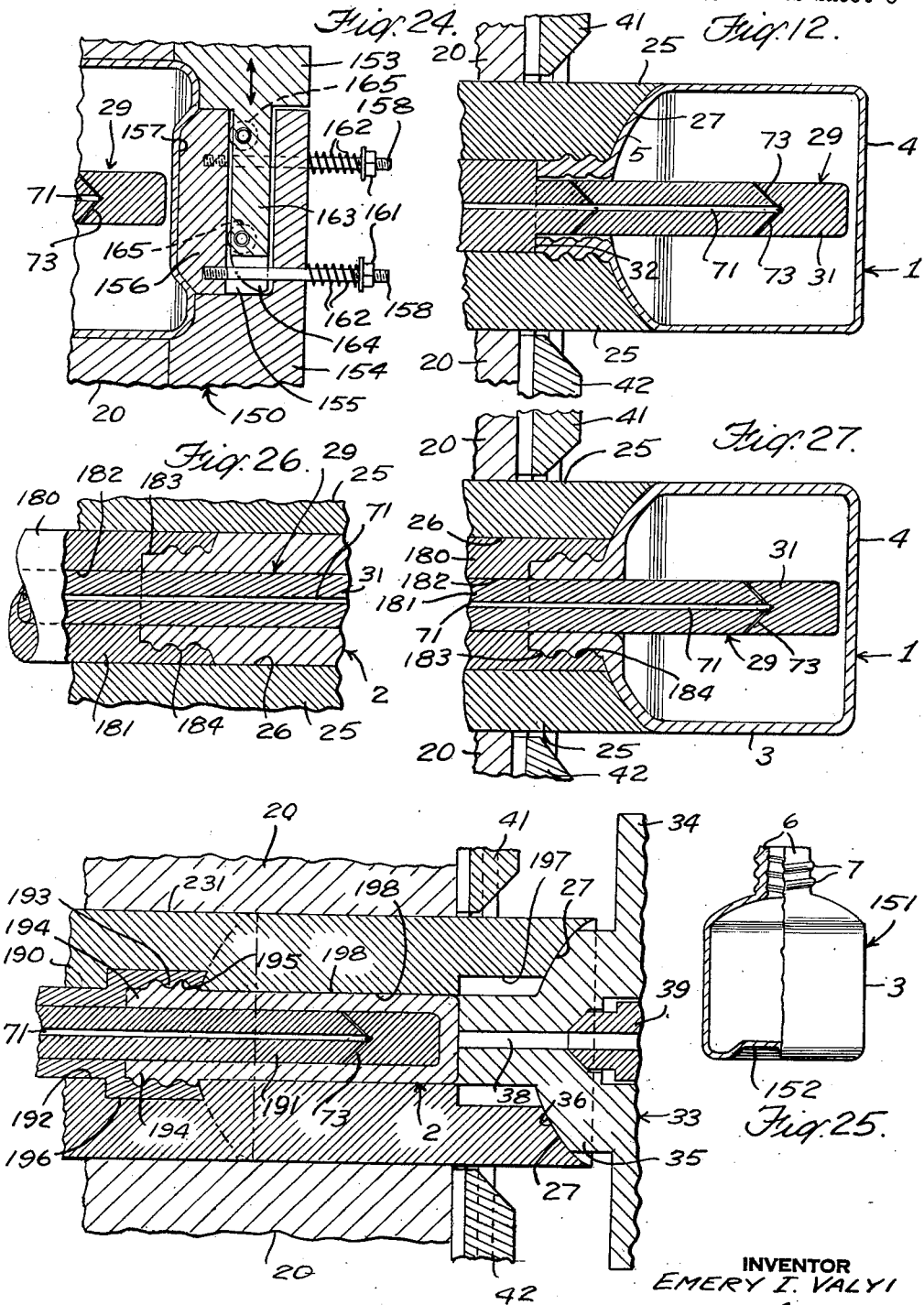

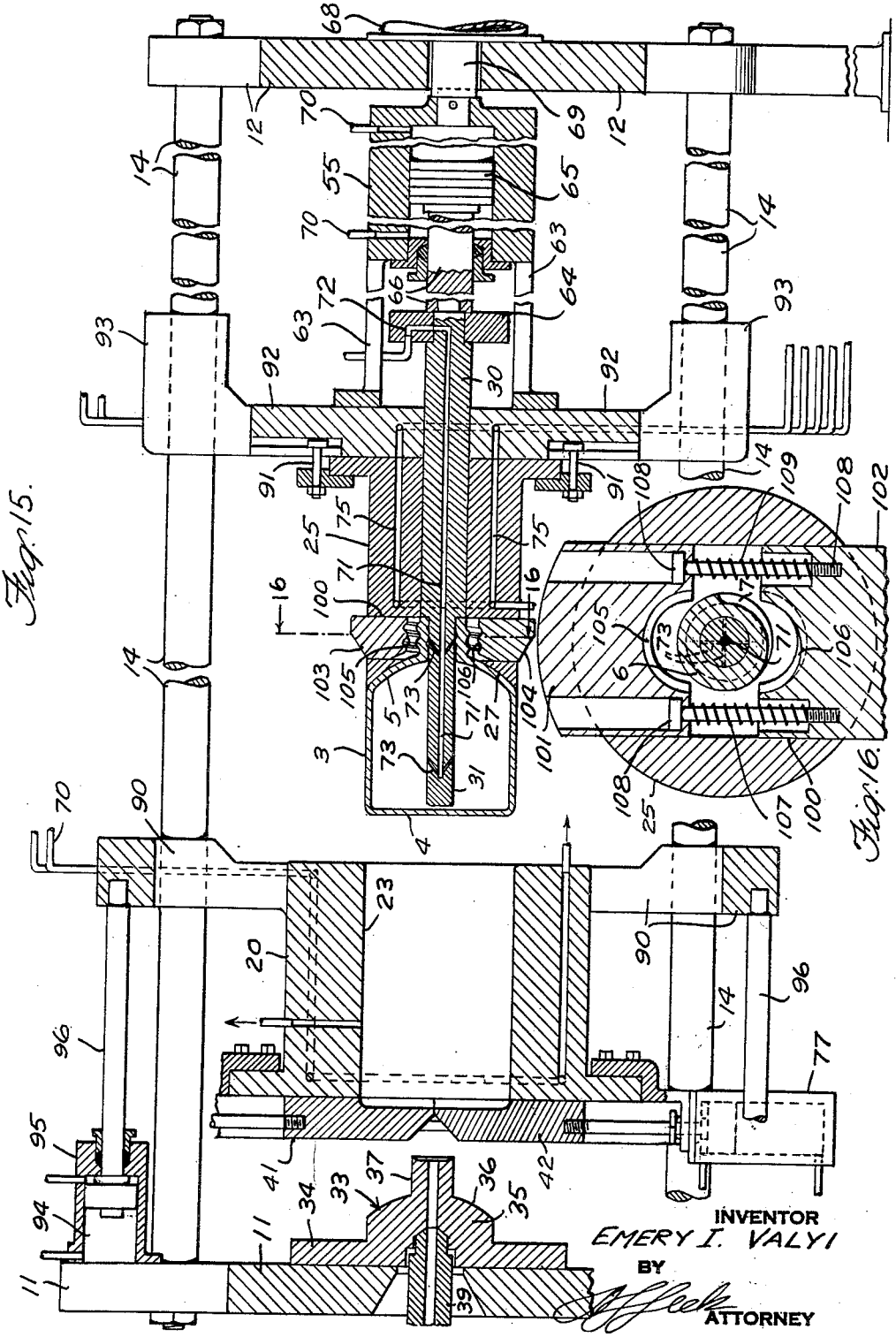

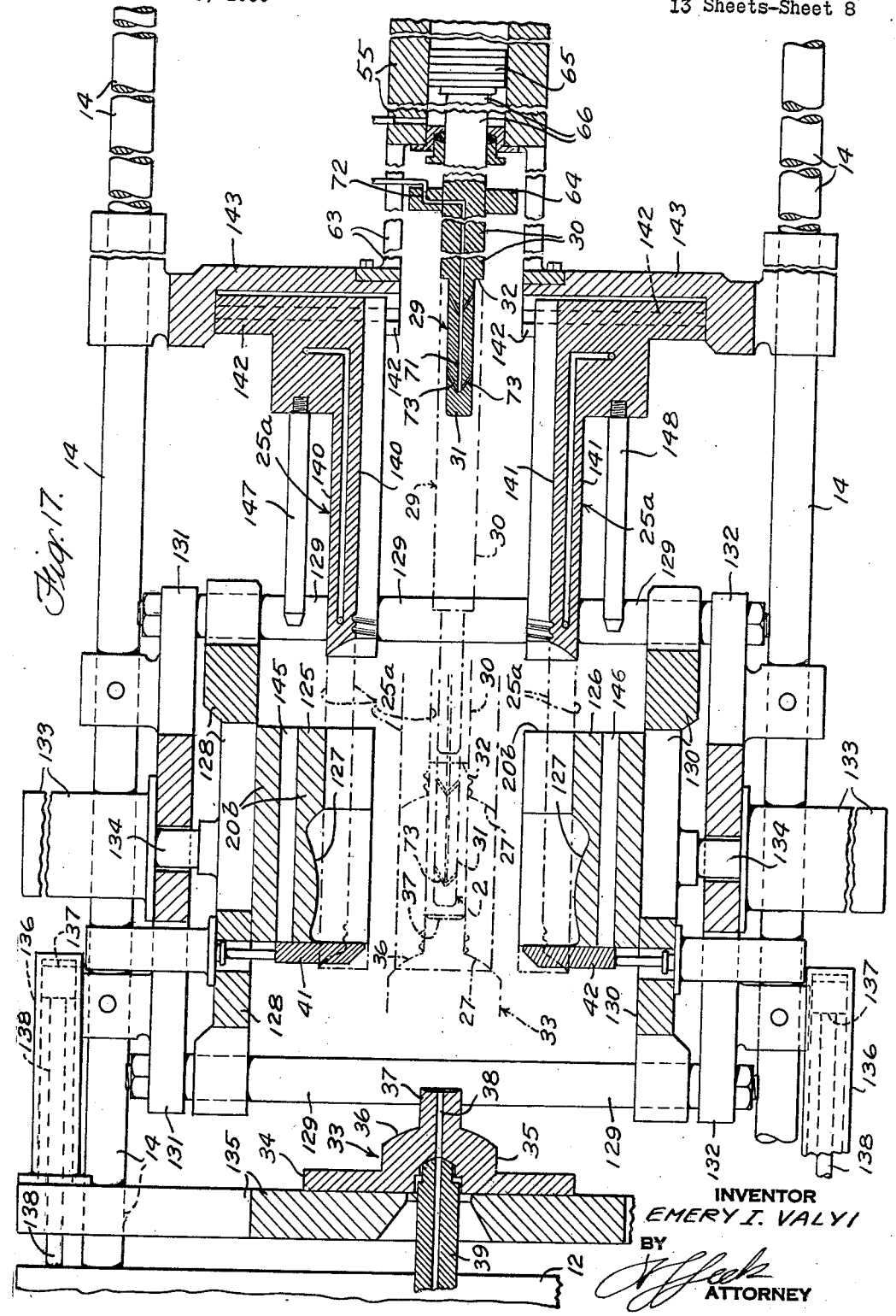

April 17, 1962  E. I. VALYI  3,029,468
APPARATUS FOR MAKING PLASTIC ARTICLES
Filed Nov. 3, 1959  13 Sheets-Sheet 9
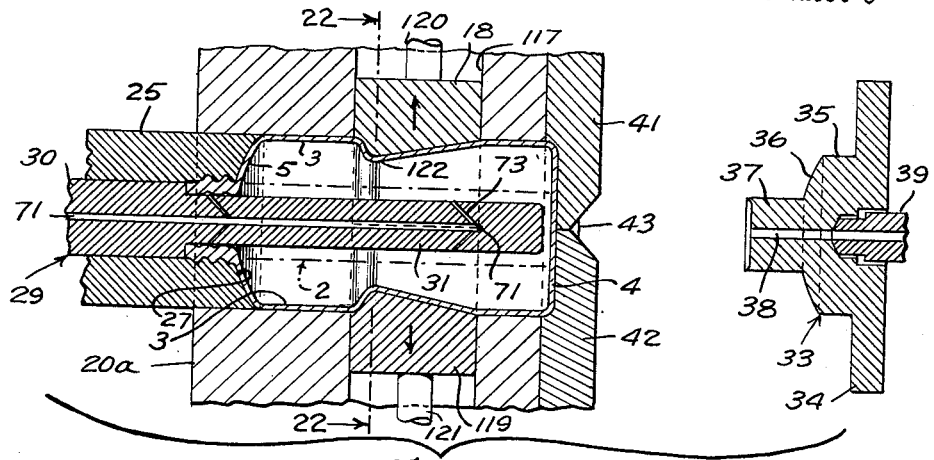
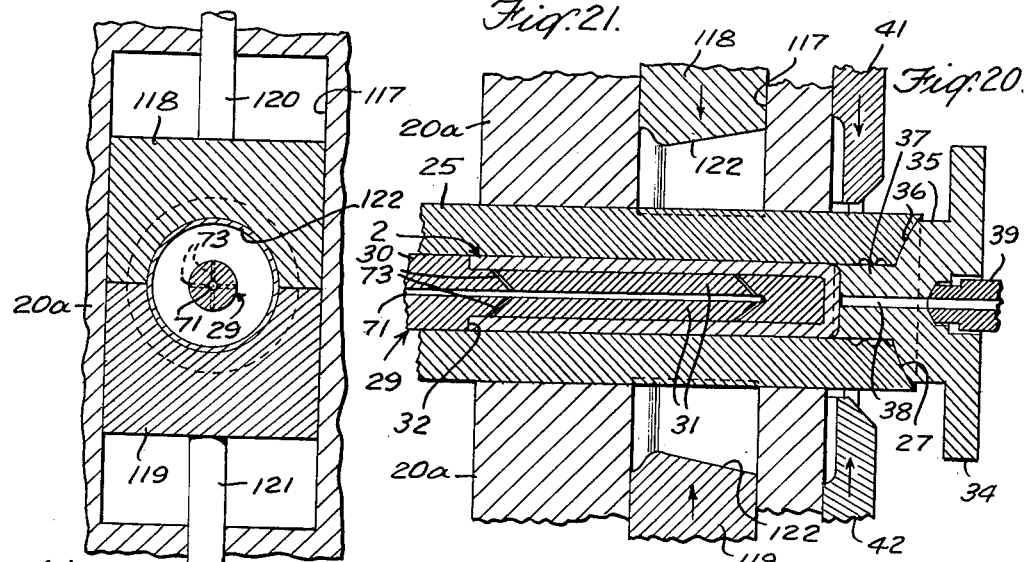
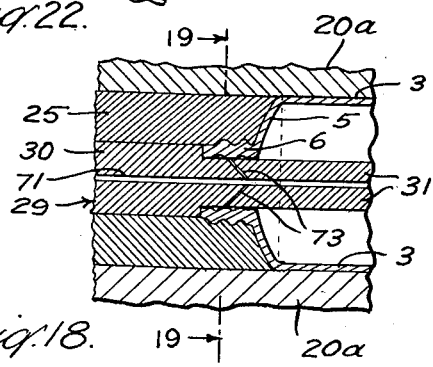
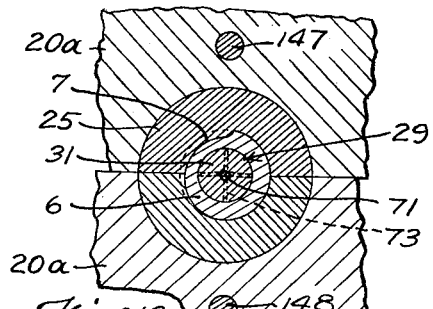
INVENTOR
EMERY I. VALYI
ATTORNEY April 17, 1962 E. I. VALYI 3,029,468
APPARATUS FOR MAKING PLASTIC ARTICLES
Filed Nov. 3, 1959 13 Sheets-Sheet 10
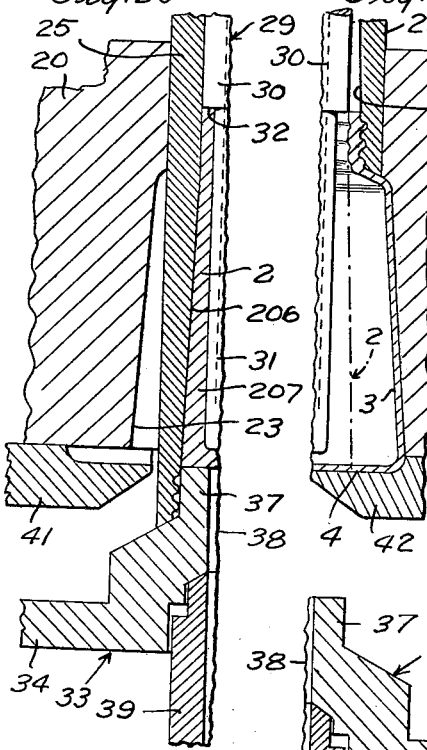
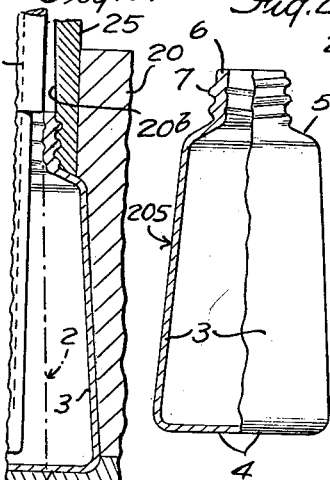
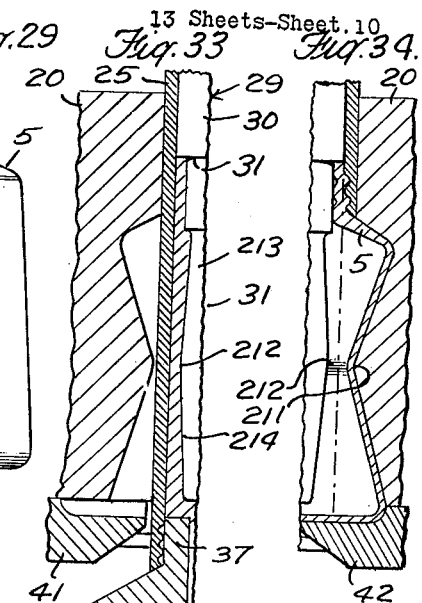
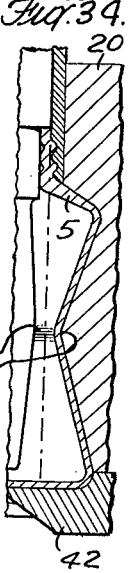
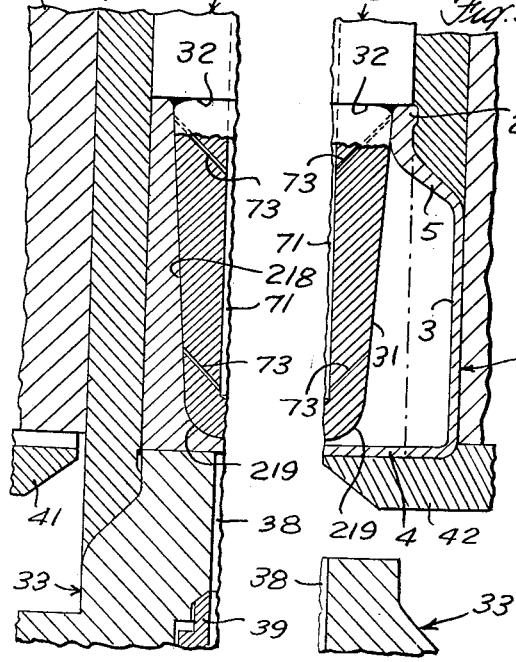
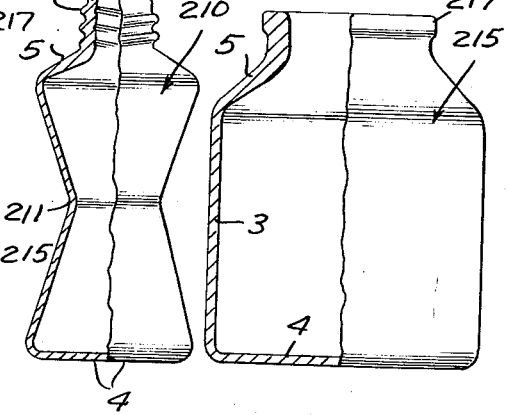
INVENTOR
EMERY I. VALYI
BY
ATTORNEY

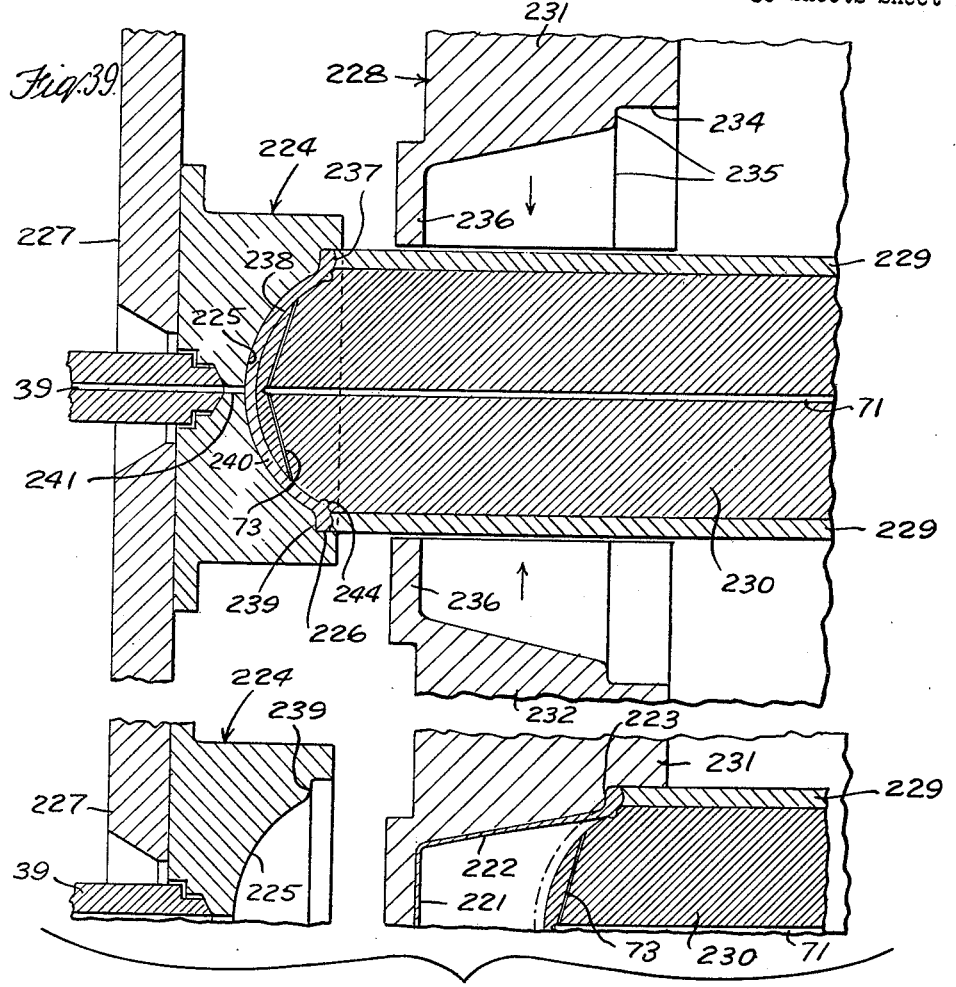

April 17, 1962  E. I. VALYI  3,029,468
APPARATUS FOR MAKING PLASTIC ARTICLES
Filed Nov. 3, 1959  13 Sheets-Sheet 12
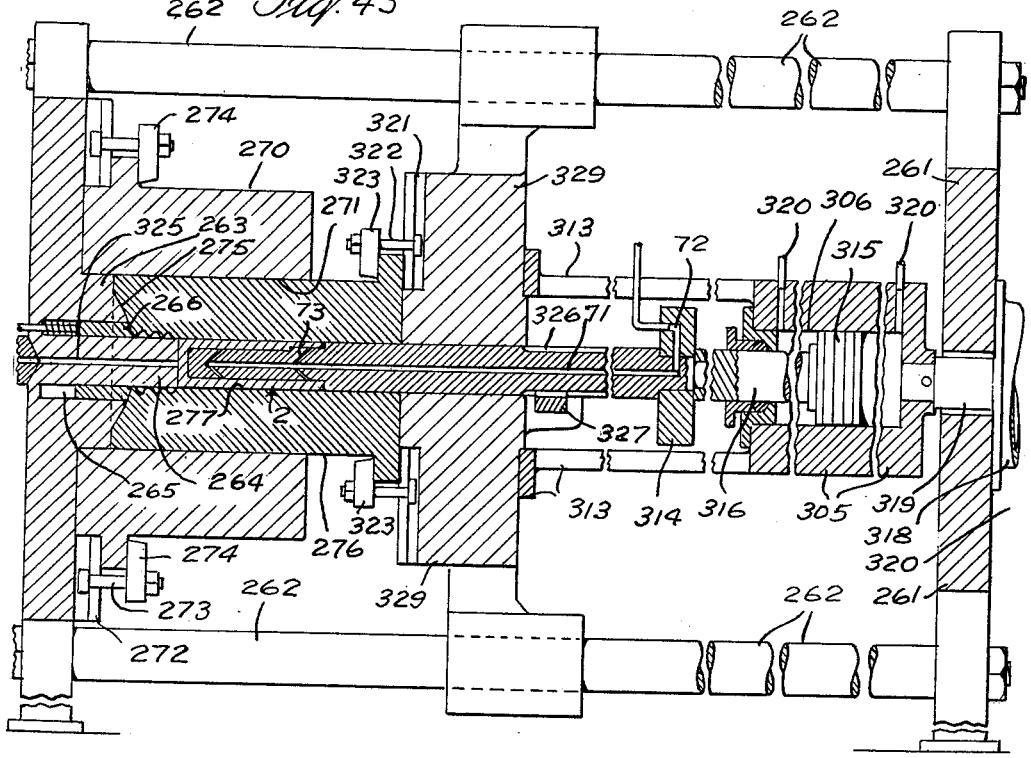
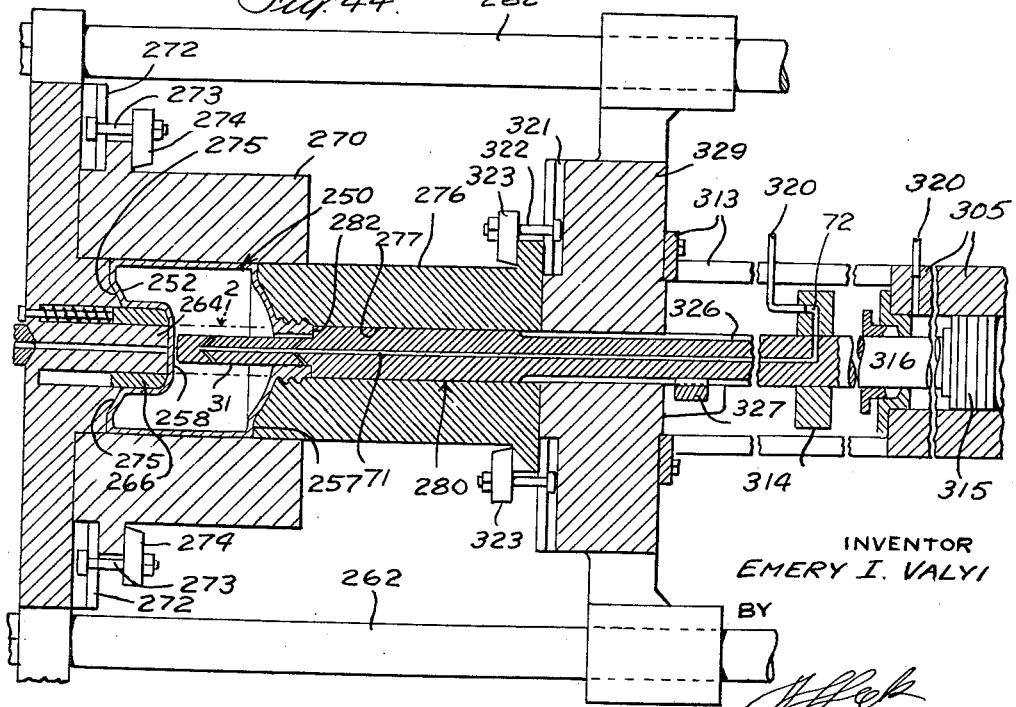
INVENTOR
EMERY I. VALYI
BY
ATTORNEY April 17, 1962 E. I. VALYI 3,029,468
APPARATUS FOR MAKING PLASTIC ARTICLES
Filed Nov. 3, 1959 13 Sheets-Sheet 13
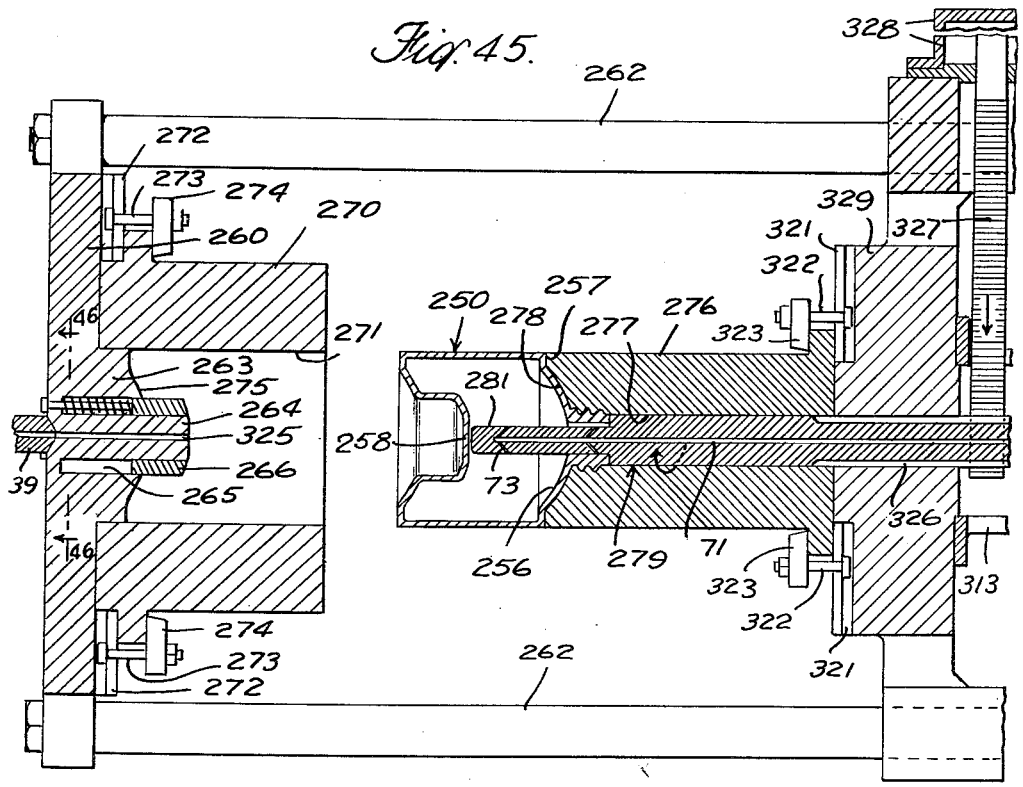
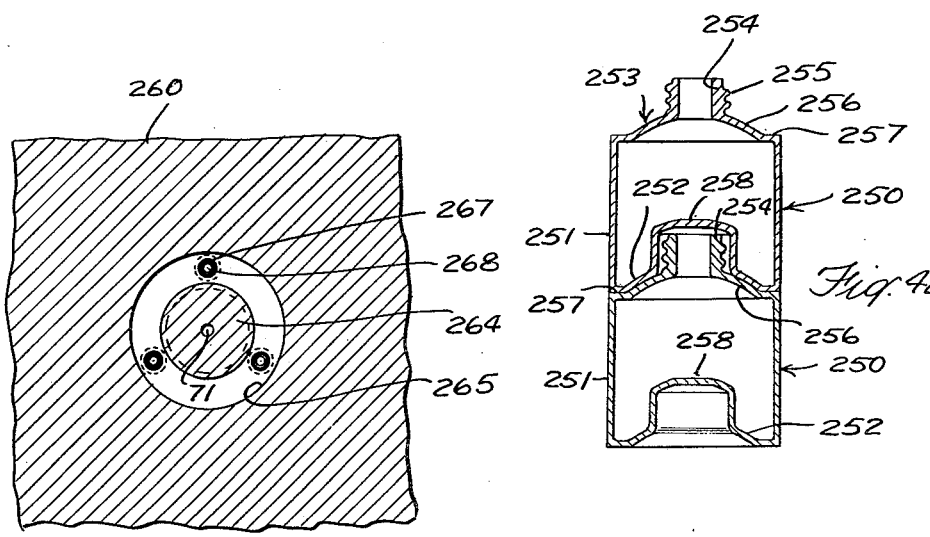
INVENTOR
EMERY I. VALYI
BY
ATTORNEY

United States Patent Office 3,029,468
Patented Apr. 17, 1962

3,029,468
APPARATUS FOR MAKING PLASTIC ARTICLES
Emery I. Valyi, New York, N.Y.
(% ARD Corporation, 20 S. Broadway, Yonkers 1, N.Y.)
Filed Nov. 3, 1959, Ser. No. 850,696
26 Claims. (Cl. 18—5)

This invention relates to apparatus for molding of hollow objects made of organic plastic materials. More particularly, it relates to apparatus for manufacture of bottles by producing a pre-form and subsequently expanding it to the desired hollow form under the action of internal pressure.

Hollow articles such as bottles have been produced by the method known as "blow molding." In that method, a tubular pre-form, herein referred to as a parison, is produced by extrusion, pressing, or injection molding. The parison is then placed within a die whose interior corresponds to the shape of the hollow article to be made, clamped firmly therein, and expanded through application of internal fluid pressure, until conformance to the shape of the die is obtained. When an extruded tube is used for this purpose, both ends must be closed, such as by pinching-off, i.e. pressure welding, before fluid pressure is admitted for the purpose of expansion. When an injection molded or pressed parison is used, it has been customary to transfer it from the injection molding or pressing tool into the blow mold. The former procedure has the disadvantage of necessitating a weld seam to be formed where the tubing is pinched off, the latter of requiring the transfer of the parison from one tool to another.

Transfer of the parison renders the respective process slow, space consuming and difficult to control. Attempts were made to combine the two tools, namely the one in which the parison is formed and the one in which the parison is expanded into its final form under internal fluid pressure, by placing the former tool retractably within the latter, thereby avoiding the need for moving the parison. The use of such combined tools was not advantageous heretofore because they gave rise to prolonged operating cycles due to the need to allow the parison to cool before the retractable portion of the combined tool could be moved without damage to the parison. A further disadvantage of such combined parison and blow tools was the difficulty in placing the gate and runner system in a manner obviating removal of the gate for best appearance and performance of the bottle. Because of that difficulty, an additional manufacturing step was often required subsequent to the removal of the article from the blow mold, such as to sever the gate and runner residue from the article.

Extraction of the product from the mold in which it reached its final shape, the blow mold, was difficult, usually requiring continued application of internal pressure to aid such extraction.

An object of this invention is to provide a new and improved molding mechanism for making hollow articles, such as bottles, flasks, cups, and the like.

Another object of this invention is to provide an improved mechanism capable of producing a parison and the article formed from it by the application of internal fluid pressure, without moving the parison in relation to the blow die except to the extent that the parison is expanded.

An additional object of this invention is to provide an improved apparatus for producing a finished hollow article without at the same time producing a gate or runner residue to be removed from the hollow article after its extraction from the blow mold, or to be removed separately from the die structure used to produce the parison.

A further object of this invention is to provide convenient and economical means for the extraction of the finished hollow article from the blow mold.

A still further object of this invention is to provide improved means to produce a parison and to expose it within the blow mold for expansion under the influence of internal fluid pressure, without subjecting the parison to stresses capable of damaging it.

A still further object of this invention is to provide improved means to produce a parison permitting predetermined desirable wall thickness distribution of the finished article.

Other and additional objects will become apparent hereafter.

The objects of the invention are accomplished in general by providing a molding machine having two platens movable in relation one to the other, one of which carries a die member designated as the cover die and the other a die member designated as the body die. The cover die contains a channel, connecting a supply of heated molding material with the cavity intended to contain the parison. The body die includes a retractable member designated as the shoulder slide and parallel there with a member designated as the blow-tube, as well as a retractable member designated as the bottom slide. The shoulder slide is constructed so as to cooperate with the body die, when in a retracted position, to form a substantial portion of the bottle shoulder and, usually, the bottle neck which may carry a thread on its outside if required. The movement of the shoulder slide takes place in a direction parallel to and usually, but not necessarily, concentric with the blow-tube and when positioned within the body die assembly rather than retracted as above, that portion which forms part of the bottle shoulder and the bottle neck is positioned entirely below the end of the blow-tube and usually outside of the blow die cavity. When so positioned, the shoulder slide and blow-tube combine to form a cylindrical die cavity which may be closed by forcing the body die against the cover die, thereby completing the parison die cavity. It will be noted that the portion of the shoulder slide later to form the bottle neck and shoulder is now in juxaposition with or below that end of the parison which later on is to form the bottom of the hollow article. After injecting the parison through the cover die, it is possible to retract the shoulder slide over the parison without dimensional interference. After retracting the shoulder slide and closing the body die cavity by positioning the bottom slide appropriately, fluid pressure is admitted to the inside of the parison through the blow-tube, causing the parison to expand to the walls of the body die, it being noted that the tip of the shoulder slide previously positioned at the bottom of the parison is now in juxtaposition with that portion of the parison which is to form the neck and at least part of the shoulder of the finished bottle. Thus the finished hollow article is produced within a die cavity defined by the bottom closure, or bottom slide, by the body die, and, at its shoulder and neck, by the shoulder slide.

It is obvious to those skilled in the art of producing hollow articles, and particularly bottles, that most materials from which the parison and later on the bottle is made are capable of softening upon exposure to heat and hardening again when cooled; and it is also obvious that the injection of the parison takes place while the material is heated to a temperature appropriate for rendering the material injectable, that expansion due to internal fluid pressure takes place while the material is still warm enough to be deformable and that the hollow article remains under internal fluid pressure in the blow die subsequent to its expansion until it has cooled sufficiently to become rigid and capable of handling without deleterious deformation.

While the shoulder slide is retracted toward the position which it will assume while the blowing step takes place, and after the bottom slide is positioned to close the blow die, vacuum may be applied within the blow die cavity to enhance the pressure differential between the inside and outside of the parison, thereby facilitating the blowing step. Vacuum may be further applied so as to minimize the amount of air remaining between the outside surface of the blown article and the inside surface of the blow mold cavity, since air tends to form an insulating layer reducing the effectiveness of cooling within the blow mold, thereby lengthening the time that must elapse before the finished article may be removed from the blow mold. Further to enhance the effectiveness of cooling, the blow mold cavity may also be flushed with a gas of better heat conductivity than that of air.

After the material of the hollow article has become comparatively rigid and strong by cooling within the blow die, it is removed therefrom. For example, the bottom slide is withdrawn and the shoulder slide advanced in the direction of that position which was mentioned at the outset as defining the parison cavity. In the course of such movement, the shoulder slide will push the bottle out of the body die cavity, usually gripping the bottle firmly at the neck, and bearing against a substantial area of the shoulder. The bottle may thus be removed from the cavity without undue deformation, to a position outside the body cavity which is accurately defined and therefore suitable for positioning in devices capable of transferring the bottle to subsequent operations such as decorating or packaging. In order to release the bottle from the hold of the shoulder slide, that portion of the shoulder slide which is in contact with the bottle neck may be parted, for example through the use of a segmented ring. The bottle may also be unscrewed, or pushed off by differential action of concentric portions of the blow-tube, or it may be blown off under internal fluid pressure.

The finished article may also be ejected from the blow mold in various other ways as hereinafter described.

The nature of the invention and the various embodiments thereof will be better understood by reference to the following description taken in connection with the accompanying drawings, wherein:

FIG. 1 is a central section of one form of bottle which is adapted to be produced by the molding mechanism as shown in FIGS. 2 to 8;

FIG. 2 is a central section through the parison from which the bottom shown in FIG. 1 is produced;

FIG. 3 is a central vertical section through one form of molding apparatus of the invention showing the dies, slides and blow-tube shaped to produce the bottle shown in FIG. 1, and with the various elements, thereof in position for the blow-tube to be withdrawn subsequent to the ejection of a finished bottle from the mechanism by one type of means provided;

FIG. 3A is a fragmentary detail view in elevation showing the bottom slide mechanism in closed position as viewed from the line 3A—3A on FIG. 3;

FIG. 5 is an enlarged detail horizontal section showing the various parts of the mechanism in position for the molding material to be injected into the mechanism to form the parison, and with the parison formed therein;

Figure 4:
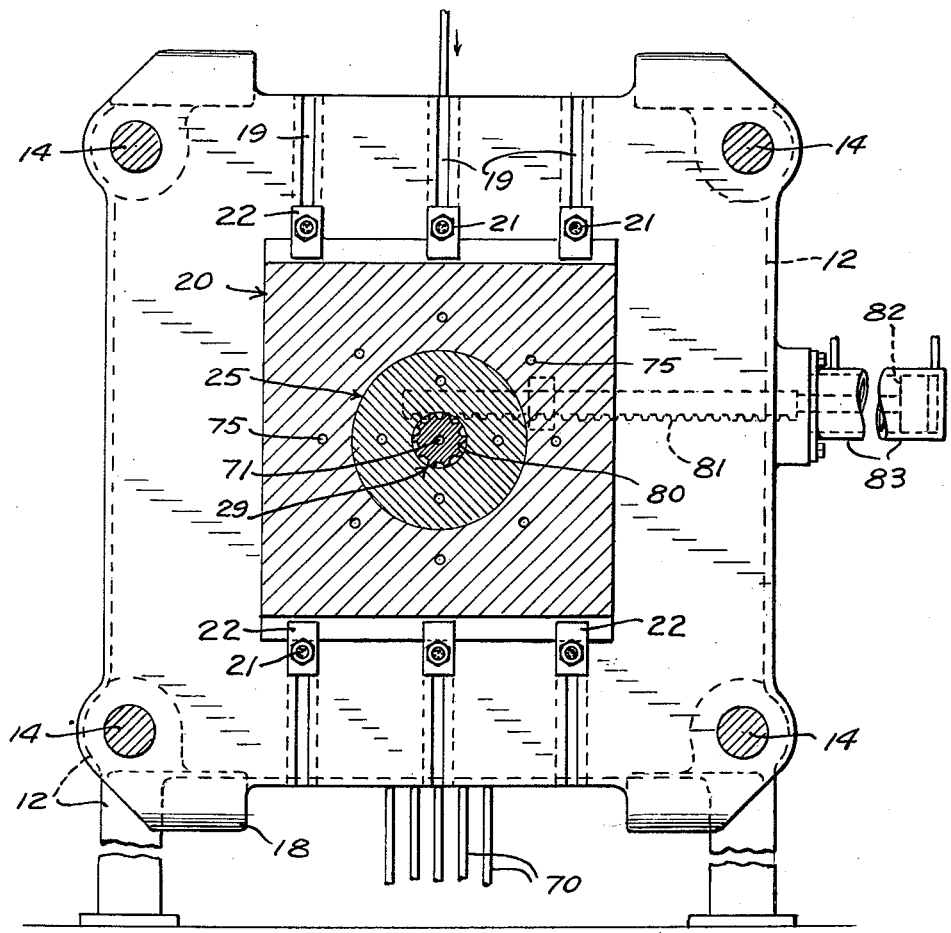
FIG. 4 is a transverse vertical section on the line 4—4 on FIG. 3.

FIG. 6 is a view similar to FIG. 5 showing the body die, the shoulder slide and blow-tube withdrawn from the cover die, the shoulder slide retracted in the body die to bottle forming position, the bottom slide means closing the open end of the body die, and the parison expanded from its initial position into bottle forming position in contact with the body die, the shoulder slide and the bottom slide means;

FIG. 7 is a view similar to FIGS. 5 and 6 showing the bottom slide means in open position, and the shoulder slide, and the finished bottle carried thereby, projected out from the body die through the open bottom slide means in position for the finished bottle to be stripped from the shoulder slide;

FIG. 8 is a view similar to FIG. 6 showing a slightly modified construction of body die and shoulder slide;

FIG. 9 is a detail section taken on the line 9—9 on FIG. 8;

FIG. 10 is an enlarged fragmentary detail section showing one way of ejecting the bottle of FIG. 1 from the mechanism shown in FIG. 3;

FIG. 11 is a view similar to FIG. 10 showing another way in which the bottle of FIG. 1 may be ejected from the mechanism shown in FIG. 3;

FIG. 11A is a transverse detail section taken on the line 11A—11A on FIG. 11;

FIG. 12 is a view similar to FIG. 6 showing the bottom slide means in open position, and the shoulder slide and the finished bottle carried thereby projected out from the body die through the open bottom slide means;

FIG. 13 is a detail sectional view showing the blow-tube of FIGS. 3 to 5 modified in a manner to provide the neck of the bottle shown in FIG. 1 with interior threads;

FIG. 14 is a detail sectional view showing a modified type of blow-tube which may be used in place of the blow-tube shown in FIGS. 3 to 8;

FIG. 15 is a view similar to FIG. 3 showing a modified type of mechanism for producing the bottle shown in FIG. 1 and for ejecting it therefrom;

FIG. 16 is an enlarged detail section taken on the line 16—16 on FIG. 15;

FIG. 17 is a central horizontal section showing a modified type of mechanism in which the body die and shoulder slide are each made up of two similar halves which are transversely movable into and out of engagement with each other, and in which the shoulder slide is longitudinally movable in either open or closed position;

FIG. 18 is a fragmentary detail sectional view showing the body die and the shoulder slide of FIG. 17 closed with the shoulder slide in bottle forming position;

FIG. 19 is a transverse section taken on the line 19—19 on FIG. 18;

FIG. 20 is a fragmentary detail sectional view showing a modified type of body die in which the mid-section thereof is made in two similar halves which are slidably mounted in the body die and are movable into and out of engagement with each other, the body die, shoulder slide and blow-tube being in parison forming position which necessitates the two halves of the mid-section being in separated or open position;

FIG. 21 is a view similar to FIG. 20 showing the body die, shoulder slide and blow-tube in bottle forming position with the two halves of the mid-section in closed position;

FIG. 22 is a transverse fragmentary section taken on the line 22—22 on FIG. 21;

FIG. 23 is a view partially in elevation and partially in section showing the bottle which is molded by the mechanism shown in FIGS. 20 to 22;

FIG. 24 is an enlarged fragmentary detail section showing a modified type of bottom slide means enabling the indenting of the bottom of a bottle as it is molded;

FIG. 25 is a view, partially in elevation and partially in section, of a bottle produced by the mechanism shown in FIG. 24;

FIG. 26 is a fragmentary detail sectional view showing a modified type of shoulder slide and blow-tube in parison forming position;

FIG. 27 is a view similar to FIG. 26 showing the shoulder slide and blow-tube of FIG. 26 in bottle forming position;

FIG. 28 is an enlarged fragmentary sectional view showing still another modified type of shoulder slide and blow-tube in parison forming position;

FIG. 29 is a view, partially in section and partially in elevation, of another form of bottle capable of being produced by the mechanism;

FIG. 30 is a fragmentary detail sectional view showing the modified type of shoulder slide used in producing the bottle shown in FIG. 29 in parison forming position;

FIG. 31 is a view similar to FIG. 30 showing the shoulder slide of FIG. 30 in bottle forming position;

FIG. 32 is a view, partially in elevation and partially in section, of another type of bottle capable of being produced in accordance with the present invention;

FIG. 33 is a fragmentary detail sectional view showing the modified type of body die, shoulder slide and blow-tube, used in producing the bottle shown in FIG. 32, in parison forming position;

FIG. 34 is a view similar to FIG. 33 showing the body die, shoulder slide and blow-tube of FIG. 33 in bottle forming position;

FIG. 35 is a view, partially in elevation and partially in section of still another type of bottle capable of being produced in accordance with the present invention;

FIG. 36 is a fragmentary detail sectional view showing the modified type of shoulder slide and blow-tube, used in producing the bottle shown in FIG. 35, in parison forming position;

FIG. 37 is a view similar to FIG. 36 showing the shoulder slide and blow-tube of FIG. 36 in bottle forming position;

FIG. 38 is a view, partially in section and partially in elevation, of a cup capable of being produced in accordance with the present invention;

FIG. 39 is an enlarged fragmentary sectional view showing a modified type of body mold, shoulder slide and blow-tube, used in producing the cup shown in FIG. 38, in parison forming position;

FIG. 40 is a view similar to FIG. 39 showing the body die, shoulder slide and blow-tube of FIG. 39 in cup forming position;

FIG. 41 is an enlarged detail sectional view showing a modified form of shoulder slide and blow-tube of FIGS. 39 and 40;

FIG. 42 is a sectional view of a pair of bottles, capable of being produced in accordance with the present invention, in which the bottoms thereof are indented in such a manner that the bottles can be nested one above the other;

FIG. 43 is a view similar to FIGS. 3, 15 and 17 showing the cover die, the body die, the shoulder die and the blow-tube, used in producing the bottle shown in FIG. 42, in parison forming position;

FIG. 44 is a view similar to FIG. 43 showing the cover die, the body die, the shoulder slide and the blow-tube of FIG. 43 in bottle forming position;

FIG. 45 is a view similar to FIGS. 43 and 44 showing the finished bottle withdrawn from the body die into position to be ejected from the mechanism; and FIG. 46 is a transverse section taken on the line 46—46 on FIG. 46.

The various forms of the invention disclosed herein, and the mode of operation thereof, will now be specifically described in connection with the drawings by the use of reference numbers, it being understood that like numbers indicate similar parts throughout the drawings.

FIG. 1 shows one type of bottle, generally indicated by the numeral 1, capable of being produced according to the invention; and FIG. 2 shows the parison, generally indicated by the numeral 2, from which the bottle is expanded under fluid pressure. As previously stated, the bottles are formed of organic plastic materials such as for example, polyethylene, polystyrene, or polyvinyl chloride.

The bottle comprises the cylindrical body section 3, the bottom 4, the shoulder 5, and the neck 6 which is exteriorly threaded as indicated at 7; and the parison 2 consists of an elongated cylindrical tube 8 which is closed at one end thereof as indicated at 9, and is open at the other end thereof as shown at 10.

Reference will be had first to FIGS. 3 to 7 of the drawings, which show a mechanism constructed for producing the bottle 1, and for purposes of clarity of description the right-hand side of the mechanism, as shown in FIG. 3, will be referred to as the front or forward end of the mechanism, and the left-hand side thereof as shown in FIG. 3, will be referred to as the rear or rearward end of the mechanism.

As shown in FIGS. 3 to 7, the mechanism of the invention comprises a pair of spaced parallel vertically disposed supporting plates 11 and 12 which are rigidly secured in fixed position upon a base or floor 13, the plates 11 and 12 are connected together by four cylindrical rods 14 which are secured to and between the plates 11 and 12. A frame, generally indicated by the numeral 15, which comprises a forward platen 16 and a rear platen 17 connected together by a plurality of longitudinally extending connecting members 18 integral therewith, is slidably mounted upon the rods 14 for longitudinal back and forth movement thereon. The front face of the forward platen 16 is provided with a plurality of spaced parallel vertically extending T slots 19 upon which a body die 20 is removably secured to the front face of the platen 16 by bolts 21 and lugs 22. The body die 20 is provided with cylindrical cavity 23 therethrough, the rear end of which is disposed in register with a complementary bore 24 in the platen 16.

A cylindrical shoulder slide 25 having an axial bore 26 is reciprocally mounted in the aligned bores 23 and 24 of the body die 20 and the platen respectively. The forward end of the shoulder slide 25 is provided with a concave surface 27 which is complementary to the convex shoulder section 5 of the bottle 1. The forward end of the bore 26 in the shoulder slide 25 is provided with internal threads 28 which are complementary to the external threads 7 on the neck of the bottle 1.

A blow-tube, generally indicated by the numeral 29, is reciprocally and rotatably mounted in the bore 26 in the shoulder slide 25. The blow-tube 29 comprises an elongated cylindrical body section 30, of the same diameter as the bore 26, in which it is mounted, and a reduced elongated cylindrical extension 31 which extends forwardly from the body section 30 in axial alignment therewith, thereby providing an annular shoulder 32 between the body section 30 and the extension 31.

A cover die, generally indicated by the numeral 33, is secured to the rear face of the supporting plate 11 in axial alignment with the blow-tube 29, shoulder slide 25 and the body die 20. The cover die 33 comprises a base 34, by which it is secured to the plate 11, and rearwardly extending cylindrical section 35, the rear end of which has a surface 36 in part complementary to the concave forward end 27 of the shoulder slide 25. A short cylindrical extension 37 fitting into the bore 26 in the shoulder slide 25 extends rearwardly from the rear surface 36 of the cover die section 35. The cover die 33 is provided with an axial conduit 38 which is connected through a nozzle 39 to a source of molding material, not shown.

The body die 20 is provided with a shoulder 40 at the forward end thereof, the front face of which is flush with the front face of the body die. A pair of opposed similar slides 41 and 42 by which the forward end of the body die cavity 23 is adapted to be opened and closed are slidably mounted upon the front face of the body die between gibbs 43 for movement toward and away from each other. The slide 41 is adapted to be actuated by a fluid operated piston 44 which is connected to the slide 41 by a piston rod 45 and is reciprocally mounted in a cylinder 46 secured to the shoulder 40 as indicated at 47; and the slide 42 is adapted to be actuated by a fluid operated piston 48 which is connected to the slide 42 by a piston rod 49 and is reciprocally mounted in a cylinder 50 secured to the shoulder 40 as indicated at 51.

The slides 41 and 42 are provided with similar semi-circular recesses 41ª and 42ª respectively which, when the slides 41 and 42 are in closed position, are adapted to register with each other and form a shallow circular recess in axial alignment with the body die cavity 23.

A forwardly extending elongated cylinder 55 having an axial bore 56 therein is attached integrally to the rear platen 17. An elongated forwardly extending cylindrical sleeve 57, the inside diameter of which is greater than the outside diameter of the cylinder 55, is also suitably secured to the rear platen 17 co-axially with the cylinder 55, thereby providing an annular chamber 58 between the cylinder 55 and sleeve 57. A tubular piston 59 is reciprocally mounted on the cylinder 55 with the enlarged rear end 60 thereof disposed within the annular chamber 58 and the outwardly extending end 61 thereof secured to the rear side of a plate 62. The rear end of the shoulder slide 25 is connected to the front face of the plate 62 by connecting links 63 which straddle a plat 64 interposed between the plate 62 and the rear end of the shoulder slide 23. A piston 65 which is reciprocally mounted in the bore 56 of the cylinder 55 is connected to the rear side of plate 64 by a connecting rod 66 which extends through an aperture 67 in the plate 62. The rear end of the blow-tube 29 which extends out from the axial bore 26 in the shoulder slide 25 is connected to the front face of the plate 64. A cylinder 68 which is suitably secured to the rear support 12 and extends rearwardly therefrom has a piston, not shown, reciprocally mounted therein which is connected to the rear platen 17 of the carriage 15 by a piston rod 69.

From the foregoing it will be apparent that the carriage 15, and all of the mechanism carried thereby, can be moved back and forth toward and away from the cover die 33 by the piston mounted in the cylinder 68; that the shoulder slide 25 is adapted to be advanced and retracted in the cavity 23 in the body die 20, by the tubular piston 59, and that the blow-tube 29 is adapted to be advanced and retracted in the axial bore 26 in the shoulder slide 25 by the piston 65. Operating fluid is adapted to be supplied to and exhausted from the various cylinders 44, 45, 56, 58 and 68 through various conduit means, all generally indicated by the numeral 70. The supply of fluid to the various cylinders is controlled by suitable valve means, not shown, which may be automatically operated to supply fluid to the various cylinders in sequentially timed relation so that the operaiton of the mechanism may be fully automatic.

The blow-tube 29 is provided with a fluid passageway 71 which extends substantially the full length of the blow-tube and is connected at the rear end thereof to a fluid passageway 72 in the plate 64, and at the forward end thereof to a plurality of outlet passageways 73 which are disposed in and extend out to the periphery of the reduced forward extension 31 of the blow-tube 29. Fluid under pressure is supplied to the passageways 71 to 73 through a flexible conduit 74 which is connected to the passageway 72 in the plate 64.

The body die 20 and shoulder slide 25 are each provided with a plurality of longitudinally extending connecting passageways 75 through which a cooling or heating medium may be circulated during operation to maintain the body die and shoulder slide at an optimum temperature, for molding, first the parison 2 and then the bottle 1. The body die 20 is provided with an outlet passageway 76 through which air may be exhausted and/or discharged during the expanding of the parison into bottle shape.

The operation of the mechanism thus far described will now be explained. As previously stated the parison 2 is formed within the shoulder slide 25 while the latter is placed within the confines of the body die 20, and then is expanded by fluid pressure into bottle shape in accordance with the configuration of the cavity 23 of the body die, the forward end 27 of the shoulder slide 25 and the recesses 41ª, 42ª in the inner face of the bottom slides 41 and 42. With the bottom slides 41 and 42 in open position, as shown in FIGS. 3 and 5, the shoulder slide 25 and the blow-tube 29 within the bore 26 of the shoulder slide 25 are brought to the position shown in FIG. 5. The frame 15 and all of the mechanism carried thereby is then moved forwardly until the forward end 27 of the shoulder slide 25 is in firm contact with the rear end 36 of the cover die 33, and the extension 37 disposed within the bore 26 of the shoulder slide 25, with the rear surface of the extension 37 spaced a short distance from the forward end of the reduced extension 31 of the blow-tube 29, all as shown in FIG. 5. Cover die extension 37 is so constructed as to prevent the flow of plastic forwardly from its rear surface. For that purpose a sealing land or taper, not shown, may be provided upon extension 37, with a corresponding land or taper upon the juxtaposed portion of the shoulder slide 25. Or if preferred the body die 20, with the shoulder slide 25 and the blow-tube 29 retracted, may be moved to the position shown in FIG. 5 and then the shoulder slide and blow-tube projected to the positions shown in FIG. 5. After the various elements have been brought to the positions shown in FIG. 5, heated flowable molding materials is projected under pressure into the bore 26 of the shoulder slide 25 about the reduced forward end 31 of the blow-tube between the shoulder 32 and the end of the extension 37. The body die is moved after a brief interval to the position shown in FIG. 3 and the shoulder slide 25 is retracted to the position shown in FIG. 6 leaving the parison 2 upon the reduced forward end 31 of the blow-tube within the cavity 23 of the body die as shown in dotted lines in FIG. 6. While the shoulder slide 25 is being retracted, the parison is constrained against shoulder 32 of the blow-tube and within the shoulder slide bore. Within its constrained portion the parison is therefore subjected to compressive forces if friction is developed between the parison and the shoulder slide in the course of relative movement of the two. Organic plastic materials are frequently capable of developing such frictional forces by virtue of their tackiness at elevated temperature. The prevalance of compressive forces will aid in preserving the parison intact and thus reduce the hazard of surface tears and fissures. The bottom slides 41 and 42 are moved to closed position as shown in FIG. 6. Fluid under pressure is then applied to the inside of the parison 2 through the conduit 71 and through passageway 73 or fluid pervious areas arranged in their place which expands the parison, while still in plastically deformable condition, into body shape in contact with the inner walls of the body die, shoulder slide 25 and bottom slides 41 and 42. Briefly preceding or simultaneously with the admission of pressure fluid into conduit 71, air contained within the body die 20 may be exhausted through vacuum conduit 76. Thus a pressure differential is established within the inside and outside of the parison, amounting to approximately 14 pounds per square inch in the event that body die 20 is connected to vacuum and conduit 71 only to the atmosphere, up to several hundred pounds per square inch, the pressure differential depending upon the nature of the material to be molded, the temperature at which deformation of the parison is to take place and the rate of heat dissipation of the molding material desired. After the shaped bottle has cooled and hardened to set condition the bottom slides 41 and 42 are moved to open position and the shoulder slide 25 and with it the finished bottle, are projected out from the body die into the position shown in FIG. 7 after which the bottle is removed from the shoulder slide.

FIGS. 8 and 9 show a slightly modified form of body die and shoulder slide which may be used in place of the body die 20 and the shoulder slide 25 shown in FIGS. 3 to 7. As shown therein the shoulder slide 25 is of lesser outside diameter than the mold cavity 23 of the body die and is slidably mounted in an axial bore 87 in a rear wall 88, of the body die 20, which intersects the cavity 23. The forward face 89 of the rear wall 88, about the bore 87, is of the same curvature as the curvature 27 of the forward end of the shoulder slide and coacts therewith to form the shoulder 5 of the bottle 1. Otherwise the construction and operation is the same as FIGS. 3 to 7.

The fluid passageways 75 in the body die 20 and the shoulder slide 25 through which a cooling medium is adapted to be circulated, are provided to enhance the cooling of formed bottles. Although not shown, it is obvious that the bottom slides 41 and 42 may be provided with passageways similar to the passageways 75 through which a cooling medium may be circulated. The blow-tube 29 is normally not cooled other than by the fluid passing through it during the blowing of the parison to bottle shape, so as to keep the inner surface of the parison at a temperature suitable for blowing. In instances where cooling is critical for the sake of optimum operating cycles the forward end of the shoulder slide is preferably constructed from a material of high heat conductivity and high heat capacity such as copper, beryllium-copper or copper-chromium alloys which may be also artificially cooled. An insulating layer 86 in the form of a refractory gasket between the forward end and the remainder of shoulder slide 25 may be provided, since it is not always desirable to cool the entire shoulder slide uniformly. Excessive cooling of the bulk of shoulder slide 25 would at times result in unwanted chilling of the parison rendering its subsequent expansion difficult. During the injecting of the molding material to form the parison, that portion of the molding material which is to form the neck 6 of the bottle 1 will have moved the greatest distance from the injection nozzle 38 in the cover die 33 and will therefore be the coolest when the blowing operation is started. In order to safeguard against undesirable cooling in that area, artificial heating means such as electric resistance heaters, not shown, may be provided. Internal cooling and/or heating of shoulder slide 25 is not always used. Instead, the shoulder slide 25 may be subdivided into a forward end of high conductivity and the remainder, of indifferent conductivity, at times separated by an insulating layer 86, whereby the forward end may be cooled externally, such as with an air blast or liquid coolant, only while in the position corresponding to FIG. 6.

The blown bottle is subjected to internal pressure while it cools since otherwise it would separate from the chilling walls of body die 20 due to thermal shrinkage rendering heat transfer into the die ineffective.

The finished bottles may be removed in various different ways, depending upon the configuration of the bottle and the type of molding material from which it is made. With some types of molding material, the bottle is sufficiently pliable and deformable that the bottle may be stripped from the shoulder slide, such as through action of shoulder 32 of blow-tube 29, without injury to the neck threads of the bottle as they are stripped from the thread forming grooves 28 about the forward end of the shoulder slide bore 26.

Another way of removing the bottle is to unscrew it from the shoulder slide as shown in FIGS. 3 and 10. As shown therein the body section 30 of the blow-tube 29, which is rotatably mounted in the shoulder slide bore 26 is made in the form of an elongated pinion 80 which is in constant mesh with a transversely extending rack 81 which is adapted to be reciprocated by a piston 82 in a cylinder 83 mounted upon the forward platen 16. The shoulder 32 of the blow-tube 29 is provided with a forwardly extending lug 84 (FIG. 10) which becomes embedded in the bottle neck during the forming of the parison. The blow-tube is then rotated by the rack and pinion 81, 80 in the proper direction to unscrew the threaded neck of the bottle from the thread forming groove 28 of the shoulder slide, while at the same time the blow-tube is being advanced at the same rate that the bottle is being unscrewed. FIGS. 11 and 12 show a slightly modified means for unscrewing the bottle from the shoulder slide. As shown therein an elongated key 85 is substituted for the lug 84 of FIG. 10 which obviates the necessity of advancing the blow-tube during the unscrewing of the bottle, or of limiting the unscrewing operation to the position of the blow-tube shown in FIG. 3. Otherwise the construction and operation are the same as in FIGS. 3 and 10. Various other means are disclosed herein for removing the finished bottle from the mechanism which will be described hereinafter.

FIGS. 15 and 16 show a modified form of the mechanism disclosed in FIGS. 3 to 7. In referring to FIGS. 15 and 16 the left hand side of FIG. 15 will be considered the forward end of the mechanism, and the right hand side will be considered the rear end of the mechanism; and like parts in FIGS. 15 and 16, and FIGS. 3 to 7 will be given like numerals. As shown in FIG. 15 the body die 20 has a plurality of ears 90 integral therewith, by which it is slidably mounted upon the rods 14; and the shoulder slide 25 is removably secured by bolt and T-slot connections 91, to a rear platen 92 having ears 93 by which it is slidably mounted upon the rods 14. The body die 20 is adapted to be moved back and forth toward and away from the cover die 33 by pistons 94 which are mounted in cylinders 95, carried by the front support 11, and connected to the ears 90 by piston rods 96. In the form shown in FIG. 15, the cylinder 57 and the tubular piston 59 of FIG. 3 are omitted, and the cylinder 55, in which the actuating piston 65 for the blow-tube 29 is mounted, is secured to the forward end of the piston rod 69 which extends forwardly out of the cylinder 68 secured to the rear face of the rear support 12. The forward end of the cylinder 55 is connected to the rear face of the platen 92 by the links 63. From this it will be seen that by actuating the piston rod 69 by the piston connected thereto within the cylinder 68, the shoulder slide 25, and the blow-tube 29 mounted therein, may be projected into the body die 20 and out through the forward end thereof into engagement with the cover die 33, with the bottom slides 41 and 42 in open position, then retracted back into the body die 20 for the expanding of the parison into bottle shape, and then withdrawn back out of the body die to the position shown in FIG. 15 for the removal of the bottle. In this form of the mechanism the shoulder slide 25 is provided with a different neck forming means which greatly facilitates the removal of the bottle from the shoulder slide. As shown in FIGS. 15 and 16, the shoulder slide 25 carries just rearwardly of the front concave face 27 thereof a transverse rectangular slot 100 which extends through the shoulder slide. In the slot 100 are slidably mounted a pair of similar opposed slides 101 and 102 which are adapted to be positively forced together as the shoulder slide 25 is projected into the body die 20 and to be spring pressed apart when the shoulder slide is withdrawn back out of the body die. The outer ends of the slides 101 and 102 have the same curvature as the outer periphery of the shoulder slide and the length of the slides 101 and 102 is such that the outer ends thereof are flush with the outer periphery of the shoulder slide when the inner ends thereof are in contact with each other. The forward edges of the outer ends of the slides 101 and 102 are bevelled as shown at 103 and 104, whereby the two slides are forced inwardly into engagement with each other as the shoulder slide is projected into the body die. The inner ends of the slides are provided with opposed similar complementary semi-circular interiorly threaded sections 105 and 106 which, when the inner ends of the slides 101 and 102 are in engagement with each other when the shoulder slide is within the body die, form the threaded neck of the bottle.

When the shoulder slide, and with it a molded bottle, are withdrawn from the body die 20 to the position shown in FIG. 15, the slides 101 and 102 are forced apart by springs 107 which are disposed about bolts 103 by which the outward movement of the slides 101 and 102 is limited. The separation of the slides 101 and 102 releases the neck of the bottle, as shown in FIG. 16, thereby permitting ready removal of the bottle from the mechanism. Otherwise the construction and mode of operation of the mechanism shown in FIGS. 15 and 16 is the same as that shown in FIGS. 3 to 6.

FIG. 23 shows a bottle, generally indicated by the numeral 115, which is similar to the bottle shown in FIG. 1 with the exception that the side wall 3 intermediate the bottom 4 and shoulder 5 is constricted as shown at 116. The production of this type of bottle requires a modified form of body die 20 in order to permit the projection of the shoulder slide 25 out through the forward end of the body die into engagement with the cover die 33 in parison forming position, and to permit the ejection of the formed bottle out of the body die. Such a body die 20$^a$ is shown in FIGS. 20 to 22 inclusive. As shown therein the body die 20$^a$ is provided with an elongated rectangular recess 117 which intersects the cavity 23 thereof. A pair of similar opposed slides 118 and 119, are slidably mounted in the recess 117 adapted to be moved into and out of engagement with each other by suitable means, such as for example by cylinders and pistons, not shown, through piston rods 120 and 121. The opposed inner ends of the slides 118 and 119 are each provided with a semi-circular recess 122, having the same contour as the constricted section 116 of the bottle 115. When the slides 118 and 119 are in closed engaging position, as shown in FIGS. 21 and 22, the recesses 122 co-act with each other to form the constricted section 116 of the bottle 115; and when the slides 118 and 119 are in separated position as shown in FIG. 20, they permit the shoulder slide 25 to be projected therethrough into parison forming position, and after the bottle has been formed from the parison the separation of the slides 118 and 119 permits the ejection of the bottle 115 from the body die 20$^a$. The body die 20$^a$ may be substituted for the body die 20 in either the mechanism shown in FIG. 3 or the mechanism shown in FIG. 15, according to which the parisons and bottles will be produced in the manner explained in connection with these figures.

FIGS. 17 to 19 inclusive show another form of mechanism by which the bottle 115 shown in FIG. 23, may be produced. In this form of mechanism the body die is made in two similar halves which are transversely movable into and out of engagement with each other during operation but which are constrained against longitudinal movement; and the shoulder slide is also made in two similar halves which during operation are transversely movable into and out of engagement with each other in unison with the movement of body die sections, and which are also longitudinally movable both in separated and contacting positions.

In referring to FIG. 17 the left-hand side thereof will again be referred to as the forward end of the mechanism and the right-hand side thereof as the rear end of the mechanism. As shown in FIG. 17 the body die 20$^b$ is made in two separate opposed halves 125 and 126 which are movable into and out of engagement with each other. Each of the halves is provided with a semi-circular cavity 127 which when the two halves are in engagement with each other conform to the shape of the bottle to be formed. One half, 125, is secured in fixed position to a slide 128 which is slidably mounted upon a pair of longitudinally spaced transversely extending rods 129, and the other half, 126, is secured in fixed position to a slide 130, similar to the slide 128, which is also slidably mounted upon the rods 129. The rods 129 are secured to and between a pair of similar platens 131 and 132 which are mounted in fixed position upon the rods 14. The slides 128 and 130 are adapted to be moved toward and away from each other upon the rods 129, to open and close the body die halves 125 and 126, by pistons, not shown, which are slidably mounted in cylinders 133, carried by the platens 131 and 132, and connected to the slides 128 and 130 by piston rods 134.

The cover die 33 is secured to a platen 135, which is slidably mounted upon the rods 14 forwardly of the body die 20$^b$ for back and forth movement toward and away from the body die 20$^b$ by cylinders 136 which are carried by the platen 135 and are slidably mounted upon fixed pistons 137 which are connected to the platen 135 by piston rods 138.

The shoulder slide 25$^a$ is made up of two similar opposed halves 140 and 141 which are slidably mounted, by gibs 142, upon a platen 143 for transverse movement into and out of engagement with each other. The blow-tube 29 is also carried by the platen 143 which is slidably mounted upon the rods 14. The platen 143 and the blow-tube 29 are adapted to be moved back and forth to bring the shoulder slide 25 and the blow-tube 29 into operative relationship with the cover and body dies by the same mechanism as shown and described in connection with FIG. 15 and the same reference characters are applied to like parts in both FIGS. 15 and 17.

The body die half 125 is provided with a small longitudinally extending cylindrical bore 145, and the body die half 126 is provided with a similar bore 146. The shoulder slide half 140 is provided with an elongated forwardly extending pin 147, and the shoulder slide half 141 is provided with a similar pin 148. When the body die 20$^b$ and shoulder slide 25$^a$ are in separated open position the pins 147 and 148 carried by the shoulder slide, are in axial alignment with the bores 145 and 146, respectively, in the body die. With the body die 20$^b$ and shoulder slide 25$^a$ in open separated position, when the shoulder slide is moved forwardly the pins 147 and 148 will enter the bores 145 and 146, and then when the body die is opened and closed, by the actuating means therefor, the shoulder slide will be opened and closed in unison therewith. FIGS. 18 and 19 show the body die 20$^b$ and shoulder slide 25$^a$ in closed bottle forming position. Otherwise the construction of the mechanism shown in FIG. 17 is the same as that shown in FIGS. 3 and 15 and like numerals as applied to like parts.

In operation after the shoulder slide 25, in open condition, has been projected forwardly into proper position in the body die, the body die and shoulder slide are moved to the closed position as shown in dotted lines in FIG. 17, after which, or simultaneously therewith the blow-tube is moved up to parison forming position, also shown in dotted lines. The cover die is then moved up into operative engagement with the shoulder slide. After the parison has been formed, the shoulder slide is retracted to bottle forming position after which the parison is expanded into shape. After the bottle has cooled and set, the body die and shoulder slide are opened leaving the bottle on the blow-tube from which it is then removed.

FIG. 24 shows a modified form of bottom slide means, generally indicated by numeral 150, which may be substituted for the bottom slide means 41—42 in FIGS. 3, 15 and 17 for producing a bottle 151, shown in FIG. 25, to have an indented bottom as indicated at 152. As shown in FIG. 24 the bottom slide means 150 comprises two opposed slides 153 and 154 which are slidably mounted on the open end of the body die 20 in the same manner as the slides 41 and 42 are mounted thereon by the gibs 43. The slide 153 may be actuated by the cylinder and piston construction 44 to 47 shown in FIG. 3, and the slide 154 may be actuated by the cylinder and piston construction 48 to 51, also shown in FIG. 3. The slide 154 at the inner end thereof is provided with a recess 155 in which a contour block 156 is slidably mounted for movement toward and away from the body die 20. The rear or inner face 157 of the contour block 156 has the same contour as the indentation, in the bottle 151, to be formed by the bottom slide means 150. The block 156 is provided with a plurality of longitudinally extending guide rods 158 which extend out through recess 155 and apertures 160 in the slide 159, and are provided with adjusting nuts 161. Coiled springs 162, which are disposed about the rods 158 between the nuts 161 and the outer face of the slide 154 yieldingly bias the the block 156 into the recess 155 until the surface 157 thereof coincides with or drops below the forward face of the body die 20. The slide 153 carries a plunger 163 having a wedge-shaped end 164 and a pair of anti-friction rollers 165 mounted therein. As the slide 153 is moved into engagement with the slide 154 the wedge-shaped end 164 of the plunger 163 enters the recess 155 behind the retracted contour block 156 and upon further movement thereof forces the block 156 by cam action out from the recess 155 to the position shown in FIG. 24. After the blown bottle has cooled to set condition, the slide 153 is first retracted to open position which permits the springs 162 to withdraw the block 156 back into the recess 155, after which the slide 154 and with it the block 156 are retracted to open slide position.

In producing bottles having exteriorly threaded necks, as heretofore described herein, the inner wall of the neck is forced away from the blow-tube and is slightly indented opposite the exterior neck threads during the blowing of the parison into bottle shape, as shown at 171 in FIGS. 6 and 12. Also in some instances, the neck forming portion of the parison, usually due to the type of molding materials used, is not forced into the neck and thread forming section of the shoulder slide with sufficient force to produce perfect exterior neck threads. This is not always critical, but where it is critical, means are provided by which a smooth inner neck wall and heavily compacted threads are produced.

This may be accomplished in several ways, one of which, as shown in FIG. 14, is to construct the blow-tube in such a manner that after the bottle has been blown into shape, the inner wall of the neck may be ironed into smooth condition, and simultaneously therewith the neck material firmly compacted into the neck forming section of the shoulder slide. Another way of accomplishing this is to construct the shoulder slide and blow-tube, as shown in FIGS. 26 and 27, in such a manner that the molding material is forced under pressure into a neck forming section of the blow-tube during the injection of the molding material in forming the parison. FIG. 28 shows another construction of the shoulder slide and blow-tube by which the neck of the bottle may be formed during the forming of the parison. FIG. 13 shows the blow-tube made in such a manner that the neck of the bottle may be firmly compacted within the neck forming section of the shoulder slide, and at the same time female threads are formed in the inner wall of the neck.

Referring first to FIG. 14, the blow-tube 29 is shown as made up of the cylindrical body section 171 which is slidably mounted in the bore 26 of the shoulder slide 25 and is provided with a central longitudinal bore 172 throughout the length thereof. A cylindrical rod 173 is slidably mounted in the bore 172 and extends out through both ends thereof. The forward end of the rod 173 beyond the bore 172 is provided with an enlarged cylindrical extension 174 which is of slightly greater diameter than the diameter of the bore 172 and rod 173, thereby defining an annular shoulder 175 between the rod 172 and extension 174. In operation the extension 174 is disposed in the position shown in dotted lines in FIG. 14 with respect to the shouldered end 176 of the section 171 of the blow-tube, whereby the distance between the shouldered end 176 of the section 171 and the shoulder 175 between the rod 173 and the extension 174, is approximately equal to the length of the bottle neck. The blow-tube is then moved to parison forming position within the shoulder slide, after which the molding material is injected into the bore 26 in the manner previously described to form the parison within the bore 26, about the extension 174 and that part of the rod 173 which extends between the shoulders 175 and 176. The shoulder slide is then moved to bottle forming position within the body die after which the parison is expanded to bottle form with the inner neck wall moved slightly out of contact with the section of the rod 173 between the shoulders 175 and 176 and slightly indented as shown at 171 in FIGS. 6 and 12. Immediately after the blowing of the parison to body form and while the molding material is still in deformable condition, the rod 173 is withdrawn in the bore 172 until the shoulder 175 is in close proximity to the shoulder 176 thereby ironing out the inner wall of the neck into smooth condition and producing a thin narrow inwardly extending annular lip (not shown) about the mouth of the bottle. After the bottle has cooled to set condition, it may be removed from the mechanism as previously described.

Reference will now be had to FIGS. 26 and 27 of the drawings in which the blow-tube 29 is constructed in such a manner that the entire neck of the bottle is formed by the blow-tube, instead of the shoulder slide, during the forming of the parison. As shown therein the blow-tube is made in two concentric inner and outer cylindrical sections 180 and 181. The outer section 180 is slidably mounted in the bore 26 of the shoulder slide 25, and the inner section is slidably mounted in a complementary bore 182 in the outer section 180. The forward end of the outer section 180 of the blow-tube is provided with a rearwardly extending annular recess 183, about the inner section 181, of the same length and diameter as the bottle neck, the inner wall of which is provided with a female thread 184 complementary to the exterior male threads on the bottle neck. Then with the blow-tube disposed in parison forming position, as shown in FIG. 26, and the inner section 181 disposed in the position shown in FIG. 27 with respect to the outer section 180, when the molding material is injected under pressure, as previously described to form the parison within the shoulder slide bore 26 about the outer end of the inner section 181, the neck of the bottle is formed within the recess 183 about the inner section 181 and is firmly compacted thereby providing a smooth inner neck wall and well-defined threads thereabout. After the bottle has cooled to set condition the shoulder slide, blow-tube and finished bottle carried thereby are projected out of the body die, as shown in FIG. 27, after which the bottle may be removed as previously described. It should be noted that when the construction of the blow-tube, as shown in FIGS. 26 and 27, is used, the wall of the body forming section of the parison is considerably thicker than that previously shown, which is acceptable for producing some types of bottles.

In FIG. 28 is shown a modified type of body die, shoulder slide, and blow-tube by which the neck of the bottle may be formed during the forming of a thin-walled parison such as shown in FIGS. 3 to 7. This type of mechanism necessitates the use of a split body die and shoulder slide and the use of the mechanism shown in FIG. 17, or one similar thereto. As shown in FIG. 28 the blow-tube comprises an outer cylindrical section 190 which is slidably mounted in the shoulder slide bore, and an inner elongated cylindrical section 191 which is slidably mounted in an axial bore 192 in the outer section 190. The forward end of the outer section 190 is provided with an enlarged cylindrical head 193 having a rearwardly extending recess 194 therein, about the inner section 191, of the same length and diameter as the bottle neck, the inner wall of which is provided with a female thread 195 complementary to the male thread about the bottle neck. Adjacent the rear end thereof the shoulder slide has a cavity 196, complementary to the head 193, in which the head 193 is adapted to be received when the shoulder slide is in parison forming position within the body die, as shown in FIG. 28, and at the forward end thereof the shoulder slide is provided with a cavity 197, similar to the cavity 196, which extends rearwardly from the shoulder forming end of the shoulder slide and in which the head 193 is adapted to be received when the shoulder slide is in bottle forming position in the body die. The shoulder slide is provided with a connecting bore 198 between the cavities 196 and 197 in which the body forming section of the parison is formed. The diameter of the bore 198 determines the wall thickness of the body forming section of the parison. As previously stated this type of blow-tube necessitates the use of a split body die and a split shoulder slide such as shown in FIG. 17 and the use of an actuating mechanism therefor such as shown in FIG. 17. In operation the blow-tube is disposed in parison forming position in the shoulder slide with the enlarged head 193 thereof disposed in the cavity 196 and the inner section 191 of the blow-tube projected forwardly through the head 193 into parison forming position, all as shown in FIG. 28. The molding material is then injected into the bore 198 and recess 194 about the inner section 191 of the blow-tube under pressure in a manner previously described, to form the parison and the threaded neck of the bottle. The material forming the neck of the bottle is firmly compacted in the recess 194 about the inner section 191 of the blow-tube thereby providing a bottle neck having a smooth inner wall and well-defined threads thereabout. After the parison and the neck of the bottle have been formed, by the injection of the molding material, the body die and shoulder slide are moved to separated open position leaving the parison and bottle neck on the blow-tube, after which the shoulder slide is retracted to bottle forming position in the body die. The body die and shoulder slide are then moved to closed position with the enlarged head 193 of the blow-tube disposed within the forward cavity 197 of the shoulder slide and the parison disposed within the body die. The parison is then expanded to bottle form in the manner previously described. After the formed bottle has cooled to set condition the shoulder slide and blow-tube, and with them the bottle, are projected out from the body die through the open end thereof. The bottle is then removed by unscrewing it from the head 193 of the blow-tube.

FIG. 13 shows a slightly modified type of blow-tube 29 by which the inner wall of the bottle neck may be provided with a female thread and the neck of the bottle firmly compacted within the neck forming section of the shoulder slide bore 26, thereby providing the bottle neck with well-defined inner and outer threads. As shown therein the reduced forward end 31 of the blow-tube 29 is provided with a male thread 201 adjacent the shoulder 32 by which the female thread 202 in the inner wall of the bottle are produced. Otherwise the mechanism for, and the mode of operation thereof for producing the bottle shown in FIG. 13 are identical with the mechanism and the mode of operation thereof shown and described in connection with FIGS. 3 to 7. Immediately prior to the blowing of the parison into bottle shape, while the molding material is still in moldable condition, the blow-tube 29 is slightly rotated in a counter-clockwise direction, while being constrained against longitudinal movement, which forces the neck material rearwardly and outwardly and firmly compacts it in the female thread 28 in the shoulder slide 25 and about the male thread 201 on the blow-tube. After the blown bottle has cooled to set condition it is removed by the rotation of the blow-tube accompanied by longitudinal movement thereof.

In producing certain shaped bottles, having a uniform wall thickness, it is necessary to provide a parison having a varying wall thickness from end to end thereof. This may be accomplished by correspondingly varying the diameter and shape of the parison forming section of the blow-tube, and/or the diameter and shape of the parison forming bore 26 in the shoulder slide 25. It is known that the thin portions of a parison of variable wall thickness will deform before the thicker ones and that they will do so at greater speed. At any given point, the wall thickness of the blown bottle will depend on the corresponding original thickness of the parison and upon the distance to which the respective part of the parison will have to be stretched in order to reach its corresponding space within the confining surfaces of the body die cavity. In order to aid the production of bottles having comparatively uniform wall thickness it is usually advisable to provide variation of parison wall thickness, and also to round the bottom of the blow-tube, and to position it so as to minimize the distance between the blow-tube and the inside surface of the body die so that the bulk of parison deformation will take place by drawing material from the correspondingly thickened areas of the parison.

In FIGS. 29 to 37 are shown various differently shaped bottles and the modified forms of blow-tube and/or shoulder slide used in producing them. FIG. 29 shows a bottle, generally indicated by the numeral 205, in which the body 3 thereof progressively increases in size between the shoulder 5 and the bottom 4 thereof, and FIGS. 30 and 31 show the manner in which the shoulder slide 25 is modified to produce the bottle 205 shown in FIG. 29. FIG. 30 shows the shoulder slide 25 and blow-tube 29 in parison forming position, and FIG. 31 shows the shoulder slide 25 and blow-tube 29 in bottle forming position. As shown therein the parison forming section of the bore 26, in the shoulder slide 25, progressively increases in diameter, or size, between the portion thereof which is coincident with the shoulder 32 of the blow-tube, when the shoulder slide and blow-tube are in parison forming position, and the thread forming forward end 28 of the bore 26, as indicated at 206 in FIGS. 30 and 31, thereby producing a parison in which the wall thereof progressively increases in thickness from the open end thereof to the closed bottom thereof as shown at 207 in FIG. 30. The cavity 23 in the body die 20 is shaped in accordance with the configuration of the bottle 205. Otherwise the mechanism and the mode of operation thereof, used in producing the bottle 205 shown in FIG. 29 is identical with that shown and described in connection with FIGS. 3 to 7.

FIG. 32 shows a bottle 210 in which the mid-section of the bottle wall is constricted as shown at 211 and flares outwardly therefrom in opposite direction to the shoulder 5 and the bottom 4 thereof, and FIGS. 33 and 34 show the manner in which the blow-tube 29 and cavity 23 in the body die 20 are modified to produce the bottle 210 shown in FIG. 32. FIG. 33 shows the shoulder slide 25 and blow-tube 29 in parison forming position, and FIG. 34 shows the sholder slide 25 and blow-tube 29 in bottle forming position. As shown therein the reduced parison forming extension 31 of the blow-tube 29 progressively decreases in diameter between the mid-section 212 thereof and the shoulder 32, and between the mid-section 212 and the outer end thereof, thereby producing a parison in which the wall thereof progressively increases in thickness between the mid-section and the open end thereof, and between the mid-section and the outer end thereof as indicated at 213 and 214, respectively. Otherwise the mechanism and the mode of operation thereof, used in producing the bottle 210 shown in FIG. 32, is identical with that shown and described in connection with FIG. 15.

In FIG. 35 is shown a bottle 215 having an enlarged neck 211, devoid of threads, and a rim 217 about the mouth thereof; and FIGS. 36 and 37 show the manner in which the blow-tube 29 is modified to produce the bottle 215 shown in FIG. 35. As shown therein the reduced parison forming end 31 of the blow-tube 29 progressively decreases in diameter, as indicated at 218, from the shoulder 32 to the outer end thereof which is rounded as indicated at 219. This produces a parison having a rounded bottom inner wall and in which the side wall thereof progressively decreases in thickness between the closed bottom and the open end thereof. Otherwise the mechanism, and the mode of operation thereof used in producing the bottle 215 shown in FIG. 35 are the same as shown and described in connection with FIG. 15.

FIG. 38 shows a cup, generally indicated by the numeral 220, which comprises a bottom wall 221, and an upwardly and outwardly flaring side wall 222 having an outwardly extending annular shoulder or rim about the upper end thereof; and FIGS. 39 to 41 show one type of mechanism by which the cup 220, shown in FIG. 38, may be produced in accordance with the present invention. As shown therein a cover die 224, having a concave segmental recess 225 therein which terminates in a cylindrical recess 226 about the outer edge thereof, is secured in fixed position to a support 227. A body die, generally indicated by the numeral 228, a shoulder or rim slide 229, and a blow-tube or core 230 are suitably mounted in operative relation to each other in axial alignment with the cover die 224. The body die 228 is made in two similar halves 231 and 232 which are adapted to be moved transversely back and forth between the open and closed positions thereof as shown in FIGS. 39 and 40, respectively by any suitable mechanism such as a pair of fluid actuated cylinders and pistons. Each of the body die halves 231 and 232 are provided with a semi-circular frusto-conical cavity 233 which terminates at the larger open end thereof in a semi-circular co-axial cylindrical cavity 234 of slightly greater diameter than the open end of the frusto-conical cavity 233, thereby providing an annular shoulder 235 between the cavities 233 and 234. The smaller ends of the frusto-conical cavities in the body die halves are closed by a pair of similar closure plates 236, one of which is integral with the body die half 231 and the other of which is integral with the body die half 232. When the body die halves 231 and 232 are in closed position the cavities and closure plate of each of the body die halves cooperate with each other to form a cavity which is closed at one end thereof and conforms to the size and shape of the cup 220 shown in FIG. 38. The shoulder or rim slide 224, the outer end 237 of which conforms to the rim 223 of the cup 220, is reciprocally mounted, by suitable supporting means, not shown, for back and forth longitudinal movement into and out of the body die 228 when the halves 231 and 232 are in open position. The blow-tube or core 230, the convex outer end 238 of which is complementary to the concave recess 225 in the cover die 224, is reciprocally mounted in the shoulder or rim slide 229. The shoulder or rim slide 229 and the blow-tube or core 230 are adapted to be moved in sequenced timed relation to each other by any suitable mechanism, such as, for example, that shown in FIG. 3. The body die 228 and the cover die 224 are relatively movable longitudinally with respect to each other. The cover die may be secured to a fixed supporting means and the body die moved toward and away from the cover die as shown in FIG. 3, or the body die may be mounted on a fixed supporting means and the cover die moved back and forth toward and away from the body die as shown in FIG. 17.

In operation, with the body die 228 in open position, the rim slide 229 and the core 230 are moved up into operative engagement with the cover die, in which position the convex outer end 238 of the core is slightly spaced from the concave recess 225 in the cover die, and the rim forming end 237 of the rim slide is slightly spaced from the shoulder 239 between the concave recess 225 and the cylindrical recess 226 in the cover die thereby forming a cavity 240 between the cover die 224 and the rim and core slides 229 and 230, all as shown in FIG. 39. The molding material is then injected under pressure into the chamber 240 through the passageway 241 in the cover die to form the parison 242 in the cavity 240. As shown herein the parison 240 is in the form of a circular disked blank, but if desired it could be in the form of a flat circular disk. The rim slide 229 and the core 230, and along with them the parison 242 are then retracted into the body die to the position shown in FIG. 40 after which the body die is closed. The parison 242 is then expanded to cup shape within the body die by fluid pressure admitted through the passageways 71 and 73 in the blow-tube or core 230. After the blown cup has cooled to set condition the body die 228 is opened and the cup ejected therefrom by the rim slide.

FIG. 41 shows the forward end of the rim slide 229 provided with a re-entrant annular concave groove 243, and the convex outer end of the core 230 provided with a small re-entrant annular groove 244 adjacent the periphery thereof, which grooves cooperate with each other to assure retention of the parison upon the core 230 at the time of its moving away from cover die 224 after injection of the molding material, and to prevent the outer peripheral section 245 of the parison from being pulled out from between the outer end of the rim slide and the annular shoulder 230 in the cover die during the blowing of the parison into bottle shape.

FIG. 42 discloses a bottle, generally indicated by the numeral 250, which is so constructed and arranged that a plurality of them may be nested one upon another, as shown in FIG. 42; and FIGS. 43 to 46, inclusive disclose one type of mechanism by which the bottle 250 shown in FIG. 42 may be produced.

As shown in FIG. 42 the bottle 250 comprises a cylindrical body 251, a bottom 252, a shoulder 253, and a neck 254 which is provided with an exterior thread 255. The shoulder 253 consists of a central convexly curved section 256 which merges with a flat peripheral section 257. The bottom 252 of the bottle has the same contour as the shoulder 253 thereof and is provided with a re-entrant recess 258 at least sufficient for the reception of the neck 254 of a bottle therebelow when the bottles are nested one above the other with the bottom 252 of an upper bottle seating on the shoulder 53 of the bottle therebelow.

Reference will now be had to FIGS. 43 to 46 in which the left-hand side thereof will be referred to as the front or forward end of the mechanism, and the right-hand side thereof referred to as the rear end of the mechanism. As shown therein the mechanism comprises a front supporting plate 260 and a spaced parallel rear supporting plate 261 which is secured in fixed position and are connected together by a plurality of tie rods 262. A cover die comprising a rearwardly extending cylindrical body section 263 and a reduced cylindrical extension 264 are formed integrally with the forward supporting plate 260. The body section 263 is provided with a cylindrical annular ring-shaped recess 265 about the reduced extension 264 in which a complementary elongated collar 266 is slidably mounted. The collar 266 is urged outwardly in the recess 265 by a plurality of coiled springs 267 which are disposed about rods 268 carried by the collar 266 to limit the outward movement thereof. The rear face 275 of the body section 263 of the cover die, about the collar 266 is provided with the same contour as the contour of the bottom 252 and shoulder 253 of the bottle 250. A body die 270 having a cylindrical bore or cavity 271 extending therethrough is secured to the support 260, with the body section 263 of the cover die disposed within the forward end of the body die cavity 271, by a plurality of T-slots 272 in the support 260, by bolts 273 and lugs 274.

A cylindrical shoulder slide 276, having an axial bore 277, is removably secured in axial alignment with the body die bore 271 by a plurality of T-slots 321, bolts 322 and blocks 323 to a platen 329 which is slidably mounted on tie rods 262. The forward end 278 of the shoulder slide is provided with a surface contour which is complementary to the contour of the bottle shoulder 253 and the bottom surface 252 thereof. The forward end of the shoulder slide bore 277 is provided with an internal thread 278 which is complementary to the external thread 255 on the neck of the bottle 250.

A blow-tube, generally indicated by the numeral 279, is reciprocally mounted in the bore 277 in the shoulder slide 276. The blow-tube 279 comprises an elongated cylindrical body section 280, of the same diameter of the shoulder slide bore 277, and a reduced elongated cylindrical extension 281 which extends forwardly from the body section 280 in axial alignment therewith, thereby providing an annular shoulder 282 between the body section 280 and the extension 281.

The rear end of an elongated cylinder 305 is secured to the forward end of a piston rod 319 which is connected to a piston, not shown, which is slidably mounted in a cylinder 318 secured to the rear side of the fixed support 261. The forward end of the cylinder 305 is connected to the rear face of the platen 330 by connecting bars 313. A piston 315 which is reciprocally mounted in the bore 306 of the cylinder 305 is connected to the rear side of a plate 314 by a piston rod 316. The rear end of the blow-tube 279 which extends out from the bore 277 in the shoulder slide 276 is rotatably connected to the front face of the plate 314 for longitudinal movement therewith.

From the foregoing it will be apparent that the platen 330, and all of the mechanism carried thereby can be moved back and forth toward and away from the body die 270 by the piston mounted in the cylinder 318, and that the blow-tube 279 is adapted to be advanced and retracted in the axial bore 277 in the shoulder slide 276 by the piston 315. Operating fluid is adapted to be supplied to and exhausted from the cylinders 305 and 318 through conduit means, all generally indicated by the numeral 320.

In operation the shoulder slide 276 and blow-tube 279 are advanced into the body die cavity 271 to the position shown in FIG. 43 in which position the forward end 278 of the shoulder slide 276 is in contact with the rear face 275 of the cover die, and the rear end of the reduced cylindrical extension 264 is disposed within the thread forming section of the shoulder slide bore 277. In this position the collar 266 is depressed, against the resistance of the springs 267, from the position shown in FIGS. 44 and 45 to the position shown in FIG. 43 by the engagement of the forward end 278, of the shoulder slide, therewith, in which position it cooperates with the extension 274 of the cover die to form the re-entrant recess 258 in the bottle 250 during the blowing of the parison into bottle form. The molding material is then injected through the passageway 325 in the cover die, into the bore 277 of the shoulder slide 276 about the reduced parison forming extension 281 of the blow-tube 279. The shoulder slide is then retracted to the position shown in FIG. 44, after which the parison is expanded into bottle form by fluid under pressure which is admitted through the passageways 326 and 327 in the blow-tube 279. After the blown bottle has cooled to set condition the shoulder slide 276, and along with it the finished bottle, are retracted to the position shown in FIG. 45.

During the retracting of the shoulder slide 276 from the position shown in FIG. 44 to the position shown in FIG. 45, the blow-tube 279 is simultaneously rotated to unscrew the bottle from the shoulder slide. For this purpose an elongated pinion 326 is provided on the rear end of the body section 280 of the blow-tube 279, which is in constant mesh with a transversely movable rack 327, adapted to be actuated by a piston, not shown, which is reciprocally mounted in a cylinder 328 carried by the platen 281.

In producing bottles molded from organic plastic material by prior known methods, the molds in which the parison was produced as well as the finishing or blow molds were parted longitudinally for removal of the parison and the finished blown bottle, respectively, whereby markings were reproduced upon the finished bottle corresponding to the parting lines of the molds, wherever two or more mold components were joined together for the operation of molding or blowing. Generally, parting lines disposed longitudinally of the bottle were more noticeable and therefore more objectionable than ones disposed transversely or circumferentially of the bottle. Not only were the longitudinally disposed parting lines unsightly, but they frequently interfered with the close packing of contiguous bottles for storage or shipment.

In producing bottles, such as shown in FIG. 42 by an apparatus such as shown in FIGS. 43 to 46, the bottles are not only devoid of longitudinally disposed parting lines, but have only one transversely or circumferentially disposed parting line which is in an inconspicuous position at the junction of the body and shoulder of the bottle.

It may be desired to arrange any of the various die members and mechanism shown herein in a set of two or more units, which may readily be done in such a manner that only one cylinder and piston will be required to simultaneously actuate several of the shoulder slides of the various units and only one cylinder and piston will be required to simultaneously actuate several of the blow-tubes of the various units. With the mechanism shown in FIG. 3 this may be done by extending the plates 62 and 64 across all of the units in the set, as indicated in FIG. 4, and connecting the shoulder slide of each of the units to the plate 62, and the blow-tube of each of the units to the plate 64. Then all of the shoulder slides may be simultaneously actuated by the single cylinder, shown in FIG. 3, for the piston therein; and all of the blow-tubes may be simultaneously actuated by the single cylinder and piston 55, 65 shown in FIG. 3. The various other mechanisms shown may be arranged in sets and actuated in a like manner.

From the foregoing it will be apparent to those skilled in this art that a very efficient and relatively simple mechanism is herewith provided for accomplishing the objects of the invention; and it is to be understood that no limitation is intended to the specific construction of the various forms of the invention shown and described herein as various modifications may be made therein within the spirit of the invention and the scope of the appended claims.

What is claimed is:

1. Apparatus for making a bottle or the like having a body portion and top neck portion of organic plastic material, which comprises a blow mold having side walls forming a mold cavity open at the top and having a bottom wall adapted to close the bottom of said cavity; a retractable sleeve slidable axially with respect to said mold, said bottom wall having separable means to provide an opening for the passage of said sleeve therethrough a blow-tube extending through said sleeve, said sleeve and blow-tube forming the side walls of a parison die when said sleeve is advanced, said blow-tube having a lower end shaped to form the inner bottom wall of said parison die, an injection nozzle disposed to inject said plastic into said die, said injection nozzle having associated therewith a die member disposed outside the said mold cavity, shaped to form the outer bottom wall of said parison die and engageable with said sleeve when said sleeve is advanced through said top and bottom openings of said blow mold to close the lower end of said parison die, said sleeve and said blow-tube being relatively movable to expose the outer surface of the formed parison for blowing in said blow mold.

2. Apparatus for making a bottle or the like having a body portion and top neck portion of organic plastic material, which comprises a blow mold having side walls forming a mold cavity open at the top and having a bottom wall adapted to close the bottom of said cavity, a retractable shoulder slide slidable axially with respect to said mold and having a surface forming, when retracted, at least a portion of the top of said mold cavity, said bottom wall having separable means to provide an opening for the passage of said shoulder slide, said slide having a bore extending upwardly from said last surface and having its lower portion shaped to form the neck of said bottle, a blow-tube extending through said bore into said mold cavity, said bore and blow-tube forming the side walls of a parison die when said slide is advanced, said blow-tube having a lower end shaped to form the inner bottom wall of the said parison die, an injection nozzle disposed to inject said plastic into said die, said injection nozzle having associated therewith a die member disposed outside the said blow mold cavity, shaped to form the outer bottom wall of said parison die and engageable with said shoulder slide when said shoulder slide is advanced through said top and bottom openings of said blow mold, to close the lower end of said parison die, said shoulder slide and said blow-tube being relatively movable to expose the outer surface of the formed parison for blowing in said blow mold.

3. Apparatus for making a bottle or the like having a body portion and top neck portion of organic plastic material, which comprises a blow mold having side walls forming a mold cavity open at the top and having a bottom wall adapted to close the bottom of said cavity, a retractable sleeve slidable axially with respect to said mold, said bottom wall having separable means to provide an opening for the passage of said sleeve therethrough a blow-tube extending through said sleeve, said sleeve and blow-tube forming the side walls of a parison die when said sleeve is advanced, said blow-tube having a lower end shaped to form the inner bottom wall of said parison die, an injection nozzle disposed to inject said plastic into said die, said injection nozzle having associated therewith a die member disposed outside the said mold cavity shaped to form the outer bottom wall of said parison die and engageable with said sleeve when said sleeve is advanced through said top and bottom openings of said blow mold, the blow mold being separable to provide a passage for the closing of said parison die, said sleeve and said blow-tube being relatively movable to expose the outer surface of the formed parison for blowing in said blow mold, said blow-tube having an outwardly extending lip cooperating with said sleeve to close said parison die and form the top surface of the parison.

4. Apparatus for making a bottle or the like having a body portion and top neck portion of organic plastic material, which comprises a blow mold having side and bottom walls forming a mold cavity open at the top, a retractable sleeve slidable axially with respect to said mold, a blow-tube extending through said sleeve, said sleeve and blow-tube forming parts of a parison die when said sleeve is advanced, said blow-tube having a lower end shaped to form the inner bottom wall of said parison die, a die member cooperating with said sleeve to close the bottom of said parison die, at least part of said last die member being retractable, and being adapted to be retracted by said sleeve when said sleeve is advanced, to shape at least part of the bottom of said bottle when said sleeve is retracted, an injection nozzle disposed to inject said plastic into said parison die, means advancing said sleeve for the injection of said parison and means retracting said sleeve for blowing said parison into said blow mold cavity.

5. Apparatus as set forth in claim 1 in which the lower portion of said sleeve is shaped to form when retracted an upper neck portion of the blow mold cavity.

6. Apparatus as set forth in claim 2 in which said blow-tube is provided with means forming an upper neck forming continuation of said blow mold cavity and said sleeve is slidable thereover.

7. Apparatus as set forth in claim 6 in which said sleeve is provided with upper and lower recesses to receive said means and is split for parting to permit movement of said sleeve between upper and lower positions.

8. Apparatus as set forth in claim 2 having means to retract said bottom wall to form a bottom opening for said mold cavity and means to advance said slide to eject the formed bottle or the like through said bottom opening.

9. Apparatus as set forth in claim 1 in which said bottom wall constitutes a member mounted on said blow mold to slide transversely thereof between open and closed positions.

10. Apparatus as set forth in claim 2 having means to retract said shoulder slide and blow-tube for withdrawing the formed bottle or the like from said mold cavity.

11. Apparatus as set forth in claim 2 in which said lower surface of said bore is threaded to form threads on the outer neck surface of said bottle.

12. Apparatus as set forth in claim 11 including means to cause relative rotation of the formed bottle and slide for withdrawing the neck of said bottle from said slide.

13. Apparatus as set forth in claim 12 in which said blow-tube is provided with means engaging said formed bottle for causing said rotational movement thereof.

14. Apparatus as set forth in claim 3 in which means is provided for advancing the blow-tube relative to said slide for ejecting the formed bottle neck from said slide.

15. Apparatus as set forth in claim 1 in which said blow mold is provided with extensible side walls adapted to form a contoured outer surface for said bottle, said extensible walls being retractable for the removal of said bottle.

16. Apparatus as set forth in claim 2 in which at least a portion of said shoulder slide is split in an axial plane and means are provided for opening the same when withdrawn from the mold cavity for releasing said bottle.

17. Apparatus as set forth in claim 1 in which at least a portion of said sleeve is split in an axial plane and means are provided for opening the same for releasing said parison.

18. Apparatus as set forth in claim 1 in which said mold is split axially into parts which are separable for releasing the formed bottle.

19. Apparatus as set forth in claim 2 which said mold and said shoulder slide are split axially into parts which are separable.

20. Apparatus as set forth in claim 1 in which said blow-tube is provided with a neck forming portion adapted to shape the inner surface of the bottle neck and means is provided for causing relative movement between said neck forming portion and said parison for exerting pressure on the molding material in said neck.

21. Apparatus as set forth in claim 2 in which the neck and shoulder forming portions of said shoulder slide are at least in part formed of a metal having high heat conductivity and the parison forming part of said slide is formed of a metal having low heat conductivity.

22. Apparatus as set forth in claim 2 in which the parison and the end surface forming portions of said slide are at least in part insulated from each other.

23. Apparatus as set forth in claim 2 in which the parison forming and the end surface forming portions of said shoulder slide are provided with independent temperature control means.

24. Apparatus for making hollow objects of organic plastic material, which comprises a separable blow mold having a mold cavity with a top opening, a blow core having an external surface shaped to form the inner surface of a blank die extending through the top opening of said mold to project beyond the bottom of said mold while said mold is separated, an injection nozzle registering with said blow core and having associated therewith a die member shaped to form the outer surface of the blank die, means retracting said blow core with the blank thereon from said last member into said mold cavity in axial alignment with said injection nozzle, means closing said cavity, and means applying fluid pressure through said blow core for expanding said blank into said blow mold cavity.

25. Apparatus as set forth in claim 24 in which said blow core is provided in part with an undercut surface adapted to grip the rim of said blank for retaining the same.

26. Apparatus as set forth in claim 24 in which a sleeve having a lower surface shaped to form the rim of said blank is disposed around said blow core and is adapted to be advanced for stripping the blown article.

References Cited in the file of this patent

UNITED STATES PATENTS

| | | |
|---|---|---|
| 2,315,478 | Parkhurst | Mar. 30, 1943 |
| 2,349,177 | Kopitke | May 16, 1944 |
| 2,469,130 | Rodman | May 3, 1949 |
| 2,631,747 | Stolte | Mar. 17, 1953 |
| 2,641,374 | Der Yuen | June 9, 1953 |
| 2,789,313 | Knowles | Apr. 23, 1957 |
| 2,872,700 | Knowles | Feb. 10, 1959 |
| 2,913,762 | Knowles | Nov. 24, 1959 |

FOREIGN PATENTS

| | | |
|---|---|---|
| 154,343 | Australia | Nov. 27, 1953 |
| 882,497 | France | June 4, 1943 |
| 1,046,602 | France | Dec. 8, 1953 |
| 1,106,868 | France | Dec. 23, 1955 |
| 1,135,341 | France | Apr. 26, 1957 |
| 1,139,990 | France | July 9, 1957 |
| 937,078 | Germany | Dec. 29, 1955 |